(12) United States Patent
    Brathwaite et al.

(10) Patent No.: US 10,897,138 B2
(45) Date of Patent: Jan. 19, 2021

(54) METHOD AND APPARATUS FOR DYNAMIC ELECTRICAL LOAD SENSING AND LINE TO LOAD SWITCHING

(71) Applicant: Katerra, Inc., Menlo Park, CA (US)

(72) Inventors: Nicholas Brathwaite, Menlo Park, CA (US); Jumie Yuventi, Sacramento, CA (US); Bahman Sharifipour, Newington, NH (US); Mark Thomas, Cupertino, CA (US)

(73) Assignee: Katerra, Inc., Menlo Park, CA (US)

( * ) Notice: Subject to any disclaimer, the term of this patent is extended or adjusted under 35 U.S.C. 154(b) by 125 days.

(21) Appl. No.: 15/952,172

(22) Filed: Apr. 12, 2018

(65) Prior Publication Data

US 2019/0319459 A1    Oct. 17, 2019

(51) Int. Cl.
    *H02J 4/00*     (2006.01)
    *G05B 15/02*    (2006.01)

(52) U.S. Cl.
    CPC ............ *H02J 4/00* (2013.01); *G05B 15/02* (2013.01)

(58) Field of Classification Search
    CPC .................................. H02J 4/00; G05B 15/02
    USPC .................................................... 307/64, 26
    See application file for complete search history.

(56) References Cited

U.S. PATENT DOCUMENTS

| 6,134,124 | A  | 10/2000 | Jungreis et al. |
| 6,369,461 | B1 | 4/2002  | Jungreis et al. |
| 6,512,966 | B2 | 1/2003  | Lof et al. |
| 7,162,878 | B2 | 1/2007  | Narayanamurthy et al. |
| 7,224,131 | B2 | 5/2007  | Wilhelm |
| 7,274,975 | B2 | 9/2007  | Miller |
| 7,466,042 | B2 * | 12/2008 | Eldredge ............... H02M 3/157 307/154 |
| 7,701,083 | B2 | 4/2010  | Savage |
| 8,008,808 | B2 | 8/2011  | Seeker et al. |
| 8,164,217 | B1 | 4/2012  | Miller |

(Continued)

FOREIGN PATENT DOCUMENTS

CN    110999011 A    4/2020
EP    3642924 A1     4/2020

(Continued)

OTHER PUBLICATIONS

"Power Distribution Systems"; Eaton, Apr. 2016; CA008104001E.

(Continued)

*Primary Examiner* — Michael R Fin
(74) *Attorney, Agent, or Firm* — Elliott, Ostrander & Preston, P.C.

(57) ABSTRACT

A switch has a first input to couple to an AC electrical power source, a second input to couple to a DC electrical power source, and an output to couple to an electrical power load. A control module transmits a signal to the electrical power load to determine whether the electrical power load uses AC electrical power or DC electrical power, and receives in response thereto an indication that the electrical power load uses one of AC electrical power and DC electrical power. The control module then transmits a signal to the switch to configure the switch to receive electrical power from one of the AC electrical power source and the DC electrical power source and transmit the received electrical power to the electrical power load, responsive to the received indication.

7 Claims, 14 Drawing Sheets

(56) References Cited

U.S. PATENT DOCUMENTS

| | | | |
|---|---|---|---|
| 8,370,650 B2 * | 2/2013 | Paniagua, Jr. | G06F 1/263 320/114 |
| 8,401,709 B2 | 3/2013 | Cherian et al. | |
| 8,421,270 B1 | 4/2013 | Miller et al. | |
| 8,442,698 B2 | 5/2013 | Fahimi et al. | |
| 8,447,435 B1 | 5/2013 | Miller et al. | |
| 8,532,808 B2 | 9/2013 | Drees et al. | |
| 8,615,381 B2 | 12/2013 | Brown | |
| 8,649,914 B2 | 2/2014 | Miller et al. | |
| 8,781,640 B1 | 7/2014 | Miller | |
| 8,958,218 B2 | 2/2015 | Reichard et al. | |
| 9,024,594 B2 | 5/2015 | Reichard et al. | |
| 9,035,492 B1 | 5/2015 | Miller | |
| 9,093,862 B2 | 7/2015 | Dennis et al. | |
| 9,312,698 B2 | 4/2016 | Subbotin et al. | |
| 9,368,967 B1 | 6/2016 | Vedder | |
| 9,373,965 B2 | 6/2016 | Liu et al. | |
| 9,438,041 B2 | 9/2016 | Roy et al. | |
| 9,459,643 B2 | 10/2016 | Miller et al. | |
| 9,563,224 B2 | 2/2017 | Saussele | |
| 9,568,903 B2 | 2/2017 | Miller | |
| 9,570,753 B2 | 2/2017 | Dennis et al. | |
| 9,685,852 B2 | 6/2017 | Somani et al. | |
| 9,692,236 B2 | 6/2017 | Wootton et al. | |
| 9,937,810 B2 | 4/2018 | Saussele et al. | |
| 10,020,656 B2 | 7/2018 | Saussele et al. | |
| 10,389,134 B2 | 8/2019 | Sharifipour et al. | |
| 2008/0114870 A1 | 5/2008 | Pu | |
| 2011/0061057 A1 | 3/2011 | Harris et al. | |
| 2011/0095606 A1 | 4/2011 | Ou | |
| 2011/0140524 A1 | 6/2011 | Realmuto et al. | |
| 2011/0307897 A1 | 12/2011 | Atterbury et al. | |
| 2012/0319477 A1 | 2/2012 | Brownlee | |
| 2012/0083930 A1 | 4/2012 | Ilic et al. | |
| 2012/0267952 A1 | 10/2012 | Ballatine et al. | |
| 2013/0300196 A1 | 11/2013 | Clark et al. | |
| 2014/0049105 A1 | 2/2014 | Ragavanis | |
| 2014/0172182 A1 | 6/2014 | Subbotin et al. | |
| 2014/0183949 A1 | 7/2014 | Murano | |
| 2014/0200723 A1 | 7/2014 | Roy et al. | |
| 2015/0121113 A1 * | 4/2015 | Ramamurthy | H02J 9/061 713/340 |
| 2015/0207316 A1 | 7/2015 | Saussele et al. | |
| 2015/0253789 A1 | 9/2015 | Saussele et al. | |
| 2015/0318705 A1 | 11/2015 | Lucas et al. | |
| 2016/0042377 A1 | 2/2016 | Ilic et al. | |
| 2016/0111971 A1 | 4/2016 | Rayner et al. | |
| 2016/0334822 A1 | 11/2016 | Kobayashi | |
| 2017/0005473 A1 | 1/2017 | Somani et al. | |
| 2017/0006135 A1 | 1/2017 | Siebel et al. | |
| 2017/0093156 A1 | 3/2017 | Ozbek et al. | |
| 2017/0179723 A1 | 6/2017 | Chen et al. | |
| 2017/0194791 A1 | 7/2017 | Budde | |
| 2017/0358929 A1 | 12/2017 | Koeppe et al. | |
| 2019/0052094 A1 | 2/2019 | Pmsvvsv et al. | |

FOREIGN PATENT DOCUMENTS

| | | |
|---|---|---|
| WO | 2010042118 A1 | 4/2010 |
| WO | 2018237089 A1 | 12/2018 |

OTHER PUBLICATIONS

"Totally Integrated Power: Planning of Electrical Power Distribution, Technical Principles"; Siemans AG 2016; Article No. EMMS-T10007-00-7600; Germany.

Dinesh Kumar, Firuz Zare, Arindam Ghosh; "DC Microgrid Technology System Architectures, AC Grid Interfaces, Grounding Schemes, Power Quality, Communication Networks, Applications and Standardizations Aspects"; 2016; p. 1-3; figure 13; US.

Youngjin Kim, "Modeling and Analysis of a DC Electrical System and Controllers for Implementation of a Grid Interactive Building"; 2017; p. 1; p. 3-4; p. 8; p. 11; p. 12; p. 14; figure; US.

International Search Report and Written Opinion for International Patent Application No. PCT/US2018/038624, dated Oct. 8, 2018, 11 pages.

Notice of Allowance for U.S. Appl. No. 15/944,720, dated Jun. 17, 2020, 8 pages.

Final Office Action for U.S. Appl. No. 15/724,206, dated Nov. 16, 2018, 33 pages.

Final Office Action for U.S. Appl. No. 15/944,720, dated Feb. 25, 2020, 9 pages.

International Preliminary Report on Patentability for International Patent Application No. PCT/US2018/038624, dated Dec. 24, 2019, 9 pages.

Non-Final Office Action for U.S. Appl. No. 15/724,206, dated Jun. 28, 2018, 25 pages.

Non-Final Office Action for U.S. Appl. No. 15/944,720, dated Nov. 19, 2019, 11 pages.

International Search Report and Written Opinion for International Patent Application No. PCT/US2019/026647, dated Aug. 1, 2019, 8 pages.

Notice of Allowance for U.S. Appl. No. 15/724,2016, dated Apr. 10, 2019, 10 pages.

* cited by examiner

US 10,897,138 B2

METHOD AND APPARATUS FOR DYNAMIC ELECTRICAL LOAD SENSING AND LINE TO LOAD SWITCHING

TECHNICAL FIELD

Embodiments of the present invention relate to electrical power distribution systems and methods. In particular, embodiments of the invention route power between an alternating current (AC) power source, a direct current (DC) power source, and a plurality of AC electrical power loads and/or plurality of DC electrical power loads.

BACKGROUND

Today, a building site may obtain AC electrical power from the public utility grid, or simply, "grid" and/or alternative energy sources (AES) to the grid, for example photovoltaic (PV) solar, wind, geothermal, etc., and/or other DC power sources.

An electrical power distribution device can connect to the AC grid and/or a plurality of AC or DC power sources to produce, convert, distribute, and store power for or to a building site.

Prior art building sites include a main AC circuit to a building's main distribution panel and then a number of branch AC circuits throughout the building site further connect to the main distribution panel to receive and distribute AC power supplied via the electrical power distribution device. It is contemplated that the electrical power distribution device can also supply DC electrical power in addition to AC electrical power. It is further envisioned that branch circuits in the building site could be wired and configured to receive and distribute AC electrical power or DC electrical power. What is needed is a way to determine whether a branch circuit or load in a building site is a DC electrical circuit or an AC electrical circuit and supply appropriate electrical power to the branch circuit.

BRIEF DESCRIPTION OF THE DRAWINGS

Embodiments are illustrated by way of example, and not by way of limitation, and can be more fully understood with reference to the following detailed description when considered in connection with the figures in which.

DETAILED DESCRIPTION

Figure 1:
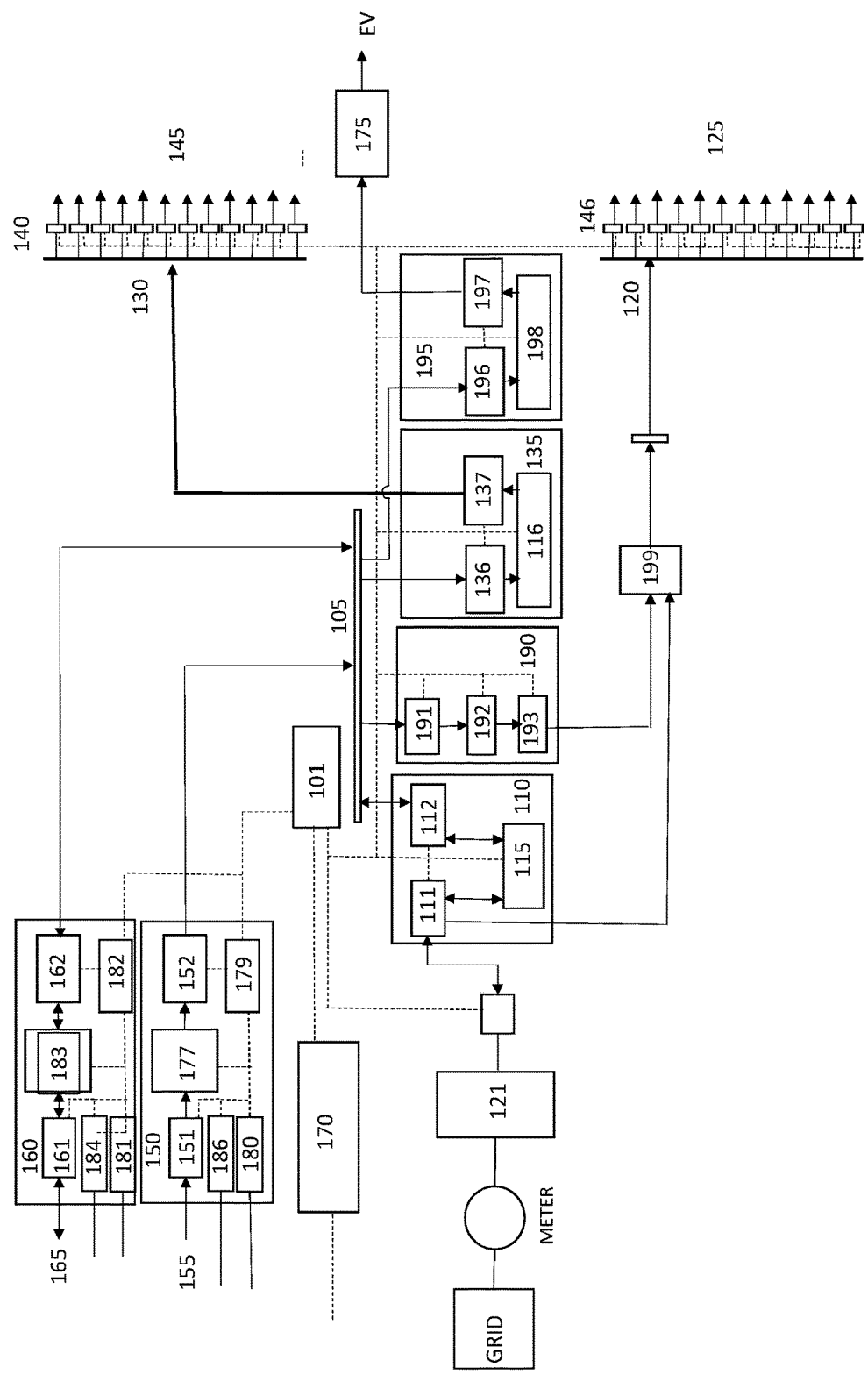
FIG. 1 illustrates an electrical power distribution system in which an embodiment of the invention may operate.

With reference to FIG. 1, an electrical power distribution system 100 comprises a central electrical power switch or router that receives DC electrical power from or to one or more electrical power sources and transmits the DC electrical power to one or more electrical power loads. In one embodiment, a DC bus 105 receives and transmits electrical power at a first fixed DC voltage level, for example, 800 volts, from one or more electrical power sources to one or more electrical power loads. The embodiment further includes a number of DC power output ports 130 to transmit electrical power at a second fixed DC voltage level to a corresponding number of DC power loads 145. For example, in one embodiment, the second fixed DC voltage level is 60 volts. In one embodiment, each output port 130 connects the electrical power distribution system to an individual unit in a building site, for example, a single family dwelling. There may also be other output ports connected to an electrical load in common or shared among the individual units, such as building site lighting or a control panel for a fire alarm system.

A like number of current and voltage sensors 140 respectively monitor current and voltage usage for each of the DC power output ports 130. These sensors and associated circuitry, among other things, detect an amount of DC transmitted by the DC power output ports 130 to the DC power loads 145. It is contemplated that the sensors 140 may be hierarchically arranged, wherein one sensor 140 communicates with the other sensors 140 and aggregates information or data about the current and/or voltage usage of the DC power loads and communicates on behalf of all the sensors 140 with a controller such as controller 101 described herein below. Alternatively, each sensor 140 may communicate individually with controller 101.

In one embodiment, a DC power output adapter 135 couples the DC bus 105 to the DC power output ports 130 to provide DC power to the DC power loads 145. The DC power output adapter comprises an input bus interface 136 that couples the DC power output adapter 135 to the DC bus, and an output interface 137 that couples the DC power output adapter to the DC power output ports 130. A DC-to-DC (DC/DC) converter 116 is coupled to the input bus interface 136 and the output interface 137 to receive and convert the electrical power transmitted on the DC bus at the first fixed DC voltage level to electrical power at the second fixed DC voltage level for transmission to the DC power output ports 130. In one embodiment, the DC/DC converter is a 10 kW DC/DC converter.

The embodiment further includes a number of alternating current (AC) power output ports 120 to transmit electrical power at a first fixed AC voltage level to a corresponding number of AC power loads 125. For example, in one embodiment, the first fixed AC voltage level is 240 volts AC (Vac). In one embodiment, each output port 120 connects the electrical power distribution system to an individual unit in the building site, for example, a single family dwelling. As in the case of output ports 130, there may be other output ports 120 connected to an electrical load in common or shared among the individual units.

A like number of current and voltage sensors 146 respectively monitor the current and voltage usage for each of the AC power output ports 120. These sensors and associated circuitry, similar to sensors 140, detect an amount of AC transmitted by the AC power output ports 120 to the AC power loads 125. It is contemplated that the sensors 146 may be hierarchically arranged, wherein one sensor 146 communicates with the other sensors 146 and aggregates information or data about the current and/or voltage usage of the AC power loads and communicates on behalf of all the sensors 146 with a controller such as controller 101. Alternatively, each sensor 146 may communicate individually with controller 101.

In one embodiment, an AC power input/output (I/O) adapter 110 couples the DC bus 105 to the AC power output ports 120 to provide AC power to the AC power loads 125. The AC power I/O adapter comprises an input/output bus interface 112 that couples the AC power I/O adapter 110 to the DC bus, and an input/output interface 111 that couples the AC power I/O adapter to the AC power output ports 120. A bidirectional AC-to-DC converter 115 is coupled to the input/output bus interface 112 and the input/output interface 111 to receive and convert the electrical power transmitted on the DC bus at the first fixed DC voltage level to electrical power at the first fixed AC voltage level for transmission to the AC power output ports 120. In one embodiment, the bidirectional AC/DC converter is a 50 kW bidirectional AC/DC converter.

The AC power I/O adapter 110 further is to couple to an AC power grid (e.g., a public utility grid) to receive and convert electrical power transmitted from the AC power grid at a second fixed AC voltage level to the electrical power at the first fixed AC voltage level for transmission to the AC power output ports 120. In one embodiment, the second fixed AC voltage level is 277 volts AC (Vac). The AC power I/O adapter 110 comprises an input/output interface 111 that couples the AC power I/O adapter to the AC power grid (or AC power grid distribution panel, or simply, AC distribution panel, 121 connected therewith). In one embodiment, the bidirectional AC/DC converter 115 is coupled to the input/output interface 111 to receive and convert electrical power transmitted from the AC power grid at the second fixed AC voltage level to the electrical power at the first fixed DC voltage level for transmission to the DC bus via input/output interface 112, and to receive and convert the electrical power transmitted on the DC bus at the first fixed DC voltage level to the electrical power at the second fixed AC voltage level for transmission to the AC power grid. In other words, the electrical power distribution system 100 can feed back electrical power from the system to the grid, as conditions warrant.

In one embodiment, the bidirectional AC/DC converter 115 is coupled to the input/output interface 111 to receive and convert electrical power transmitted from the AC power grid at the second fixed AC voltage level to the electrical power at the first fixed AC voltage level for transmission to the AC power output ports 120 via input/output interface 111.

In one embodiment, an AC power output adapter 190 couples the DC bus 105 and to the plurality of AC power output ports 120 to provide AC power to the AC power loads 125. The AC power output adapter comprises an input bus interface 191 that couples the AC power output adapter to the DC bus, and an output interface 193 that couples the AC power output adapter to the AC power output ports 120. A DC-to-AC (DC/AC) converter 192 is coupled to the input bus interface 191 and the output interface 193 to receive and convert the electrical power transmitted on the DC bus at the first fixed DC voltage level to the electrical power at the first fixed AC voltage level for transmission to the AC power output ports. In an alternative embodiment, the bidirectional AC/DC converter 115 in the AC I/O power adapter 110 could provide the same functionality as DC/AC converter 192, but it would not provide the redundancy and failsafe functionality of having this functionality provided by DC/AC converter 192 located in the separate adapter 190.

In one embodiment, an DC power output adapter 195 couples the DC bus 105 and to DC power output port 175 to provide DC power to a DC power load 175, such an electric vehicle charging station. The DC power output adapter comprises an input bus interface 196 that couples the DC power output adapter to the DC bus, and an output interface 197 that couples the DC power output adapter to the DC power output port 175. A DC-to-DC (DC/DC) converter 198 is coupled to the input bus interface 196 and the output interface 197 to receive and convert the electrical power transmitted on the DC bus at the first fixed DC voltage level to electrical power a fixed DC voltage level for transmission to the DC power output port 175.

In one embodiment, with reference to FIG. 1, a controller 101 is coupled to the DC power output adapter 135, the current and voltage sensors 140 to control an amount of the electrical power transmitted on the DC bus 105 at the first fixed DC voltage level that the DC power output adapter 135 is to receive and convert to the electrical power at the second fixed DC voltage level for transmission to the DC power output ports 130, based on the amount of DC transmitted by the DC power output ports to the DC power loads as detected by the current and voltage sensors 140.

In one embodiment, controller 101 is coupled to the AC power I/O adapter 110, and the current and voltage sensors 146, to control an amount of the electrical power transmitted from the AC power grid at the second fixed AC voltage level that the AC power I/O adapter 110 is to receive and convert to the electrical power at the first fixed AC voltage level for transmission to the AC power output ports 120, based on the amount of AC transmitted by the AC power output ports 120 to the AC power loads 125 as detected by current and voltage sensors 146.

In one embodiment, controller 101 is coupled to the DC power output adapter 135, the current and voltage sensors 140, and the AC power I/O adapter 110, to control an amount of the electrical power transmitted from the AC power grid at the second fixed AC voltage that the AC power I/O adapter 110 is to receive and convert to the electrical power at the first fixed DC voltage level for transmission to the DC bus 105, based on the amount of DC transmitted by the DC power output ports 130 to the DC power loads 145 detected by current and voltage sensors 140.

In one embodiment, controller 101 is coupled to the AC power output adapter 190 and the current and sensors 146, to control an amount of the electrical power transmitted on the DC bus 105 at the first fixed DC voltage level that the AC power output adapter 190 is to receive and convert to the electrical power at the first fixed AC voltage level for transmission to the AC power output ports 120, based on the amount of AC transmitted by the AC power output ports to the AC power loads as detected by the current and sensors 146.

In one embodiment, controller 101 is to control the amount of the electrical power transmitted on the DC bus 105 at the first fixed DC voltage level that the AC power I/O adapter 110 is to receive and convert to the electrical power at the second fixed AC voltage level for transmission to the AC power grid, based on one or more of the amount of DC transmitted by the plurality of DC power output ports 130 to the plurality of DC power loads 145 as detected by the first circuitry, the amount of AC transmitted by the plurality of AC power output ports 120 to the plurality of AC power loads 125 as detected by the second circuitry, the state of the DC power source, and the state of the DC power storage device.

In one embodiment, the electrical power distribution system further comprises a DC power input adapter 150 coupled to the DC bus 105 and to couple to a DC power source 155 to provide DC power to the electrical power distribution system. In one embodiment, the DC power source is an alternative energy source, such as a PV solar power source. The DC power input adapter includes an input interface 151 that couples the DC power input adapter 150 to the DC power source 155, and an output bus interface 152 that couples the DC power input adapter to the DC bus 105. A DC-to-DC (DC/DC) converter 177 is coupled to the input interface 151 and the output bus interface 152 to receive and convert electrical power transmitted by the DC power source at a third fixed DC voltage level to the electrical power transmitted on the DC bus at first fixed DC voltage level. In one embodiment, the third fixed DC voltage level is 1000 volts. In one embodiment, the DC/DC converter is a 1000 volt to 800 volt DC/DC converter.

Controller 101 further is coupled to the DC power input adapter 150 to control an amount of the electrical power at the third fixed DC voltage level that the DC power input adapter 150 is to receive and convert to electrical power at the first fixed DC voltage level for transmission on the DC bus 105.

The controller, in one embodiment, controls the amount of the electrical power at the third fixed DC voltage level that the DC power input adapter 150 is to receive and convert to electrical power at the first fixed DC voltage level for transmission on the DC bus 105, based on one or more of the amount of DC transmitted by the DC power output ports 130 to the DC power loads 145 as detected by the current and voltage sensors 140, the amount of AC transmitted by the AC power output ports 120 to the AC power loads 125 as detected by the current and voltage sensors 146, and the desirability of or the priority assigned to the electrical power transmitted from the AC power grid at the second fixed AC voltage level relative to the desirability of or priority assigned to the electrical power transmitted by the DC power source 155 at a third fixed DC voltage level. The desirability of or priority assigned to the electrical power transmitted from the AC power grid at the second fixed AC voltage level relative to the desirability of or priority assigned to the electrical power transmitted by the DC power source 155 at a third fixed DC voltage level may be based on, for example, one or more of unit price, environmental impact, availability, quality, stability, capacity, transmission or delivery efficiency, location or distance of a source, etc.

In one embodiment, DC power input adapter 150 includes parameter sensor 180 to detect a state of the DC power source 155. In such case, the controller 101 may control the amount of the electrical power at the third fixed DC voltage level that the DC power input adapter 155 is to receive and convert to electrical power at the first fixed DC voltage level for transmission on the DC bus 105 based on the state of the DC power source, or environmental factors that impact the state of the DC power source, such as, in the case where the DC power source is a PV solar power source, the temperature, wind, intensity and/or angle of incidence of sunlight to the DC power source, time of day, season, etc. In one embodiment, DC power input adapter 150 further includes a controller 186 in communication with DC power source 155 by which DC power input adapter 150 can control functionality of the DC power source 155.

The electrical power distribution system, in one embodiment, comprises a DC power input/output (I/O) adapter 160 coupled to the DC bus 105 and further to couple to a DC power storage device 165. The DC power I/O adapter includes an input/output interface 161 that couples the DC power I/O adapter to DC power storage device 165, and an input/output bus interface 162 that couples the DC power I/O adapter to the DC bus 105. A bi-directional DC/DC converter is coupled to the input/output interface 161 and the input/output bus interface 162 to receive and convert the electrical power transmitted on the DC bus 105 at the first fixed DC voltage level to an electrical power transmitted to the DC power storage device 165 at a fourth fixed DC voltage level, and to receive and convert the electrical power transmitted from the DC power storage device 165 at the fourth fixed DC voltage level to the electrical power transmitted on the DC bus 105 at the first fixed DC voltage level. In one embodiment, the fourth fixed DC voltage level is 400 volts. In one embodiment, the DC/DC converter is a 400 volt to 800 volt DC/DC converter. In one embodiment, the DC power storage device is a Lithium-ion battery, and may include a battery management system.

In one embodiment, the controller 101 further is coupled to the DC power I/O adapter 160 to control an amount of the electrical power transmitted on the DC bus 105 at the first fixed DC voltage level that the DC power I/O adapter is to receive and convert to electrical power at the fourth fixed DC voltage level for transmission to the DC power storage device 165. In one embodiment, the amount of the electrical power transmitted on the DC bus 105 at the first fixed DC voltage level that the DC power I/O adapter 160 is to receive and convert to electrical power at the fourth fixed DC voltage level for transmission to the DC power storage device 165 is based on one or more of the amount of DC transmitted by the DC power output ports 130 to the DC loads 145 as detected by the current sensors 140, the amount of AC transmitted by the AC power output ports 120 to the AC loads 125 as detected by the current sensors 146, and the amount of the electrical power transmitted by the DC power source 160 at the third fixed DC voltage level.

In another embodiment, the controller further is to control an amount of the electrical power at the fourth fixed DC voltage level that the DC power I/O adapter 160 is to receive and convert for transmission on the DC bus 105 at the first fixed DC voltage level. The controller may do so based on one or more of the amount of DC transmitted by the DC power output ports 130 to the DC loads 145 as detected by the current sensors 140, the amount of AC transmitted by the AC power output ports 120 to the AC loads 125 as detected by the current sensors 146, the amount of the electrical power transmitted by the DC power source 155 at the third fixed DC voltage level, the desirability of or priority assigned to the electrical power transmitted from the AC power grid 120 at the second fixed AC voltage level relative to the desirability of or priority assigned to the electrical power transmitted by the DC power I/O adapter 165 at the fourth fixed DC voltage level, and the desirability of or priority assigned to the electrical power transmitted from the DC power source 155 at the third fixed DC voltage level relative to the desirability of or priority assigned to the electrical power transmitted by the DC power I/O adapter 165 at the fourth fixed DC voltage level. In these embodiments, desirability of or priority assigned to a particular electrical power source may be based on, for example, one or more of unit price, environmental impact, availability, quality, stability, capacity, transmission or delivery efficiency, location or distance of a source, etc.

In one embodiment, DC power I/O adapter 160 includes parameter sensor 181 to detect a state of the DC power storage device 165. In such case, the controller 101 may control the amount of the electrical power at the fourth fixed DC voltage level that the DC power I/O adapter 155 is to receive and convert to electrical power at the first fixed DC voltage level for transmission on the DC bus 105 based on the state of the DC power storage device, or factors that impact the state of the DC power storage device. In one embodiment, DC power I/O adapter 160 further includes a controller 184 in communication with DC power storage device 165 by which DC power I/O adapter 160 can control functionality of the DC power storage device 165.

In one embodiment, controller 101 is a central controller located within the electrical power distribution system and communicates with a microcontroller or the like located in each component it controls, for example, microcontrollers 180 and 181 respectively located in adapters 150 and 160. In another embodiment, the controller may be a distributed controller system, wherein each component described herein as being in communication with the controller may in fact incorporate or communicate with its own controller or a controller shared with a subset of the components in the electrical power distribution system. The controllers in such case communicate with each other as needed in order to perform the functions described herein. In all cases, the controller(s) may be hardwired in communication with the components and/or may be wirelessly in communication with the components. In another embodiment, an external controller 170 communicates with the controller(s). Controller 170 may be a part of a cloud-computing based energy management system and connect to controller 101 via the Internet, for example.

Embodiments of the invention can further be described as an electrical power distribution system 100 that includes an electrical power router. The power router has a number of input ports and a number of output ports, and distributes an electrical signal received on one or more of the input ports to one or more of the output ports. In one embodiment, the electrical power router is a common direct current (DC) bus with a number of bus interfaces. In such an embodiment, an electrical input adapter, e.g., DC power input adapter 150, is coupled to one of the electrical power router's input ports and further to couple to an electrical power source, e.g., PV solar power source 155. The electrical input adapter receives and converts an electrical signal input from the electrical power source to the electrical signal distributed by the power router. The electrical input adapter in such embodiment includes an interface, e.g., interface 151, with the electrical power source that has electrical and mechanical characteristics that match those of the electrical power source, and an interface, e.g., interface 152, with the electrical power router that has electrical and mechanical characteristics that match those of the electrical power router.

Further in such an embodiment, an electrical output adapter, e.g., DC power output adapter 135, is coupled to one of the output ports and further to couple to an electrical power load, e.g., DC power loads 145. The electrical output adapter receives and converts the electrical signal distributed by the power router from the one of the output ports to an electrical signal output to the electrical power load. The electrical output adapter includes an interface, e.g., interface 137, with the electrical power load that has electrical and mechanical characteristics that match those of the electrical power load, and an interface, e.g., interface 136, with the electrical power router that has electrical and mechanical characteristics that match those of the electrical power router.

The embodiment further includes a controller 101 coupled to the electrical input adapter, the electrical output adapter, and the electrical power router, to control transmission of the electrical signal from the electrical input adapter to the electrical output adapter through the electrical power router. A subset of the bus interfaces have an electrical circuit coupled to the DC bus and to couple to a DC voltage output of an AC to DC converter or DC to DC converter of the electrical input adapter. The subset of the bus interfaces control an amount of current provided in the electrical signal to be distributed by the power router.

In one embodiment of the electrical distribution system, the subset of bus interfaces control the amount of current provided in the electrical signal to be distributed by the power router by performing one or more of the functions of: current direction control, current limit control, current magnitude control, current sensing, voltage sensing and voltage control on an input to the electrical circuit, voltage sensing and voltage control on an output of the electrical circuit.

In this embodiment, a second subset of the bus interfaces includes an electrical circuit coupled to the DC bus and to couple to a DC voltage input of a DC to DC converter or DC to AC converter of the electrical output adapter. The second subset of the bus interfaces control an amount of current received from the electrical signal distributed by the power router.

In one embodiment, the second subject of bus interfaces controls the amount of current received from the electrical signal distributed by the power router by performing one or more of the functions of: current direction control, current limit control, current magnitude control, current sensing, voltage sensing and voltage control on the input to the electrical circuit, voltage sensing and voltage control on the output of the electric circuit.

According to an embodiment of the invention, a switch has a first input to couple to an AC electrical power source, a second input to couple to a DC electrical power source, and an output to couple to an electrical power load. A control module transmits a signal to the electrical power load to determine whether the electrical power load uses AC electrical power or DC electrical power, and receives in response thereto an indication that the electrical power load uses one of AC electrical power and DC electrical power. The control module then transmits a signal to the switch to configure the switch to receive electrical power from one of the AC electrical power source and the DC electrical power source and transmit the received electrical power to the electrical power load, responsive to the received indication.

Figure 2:
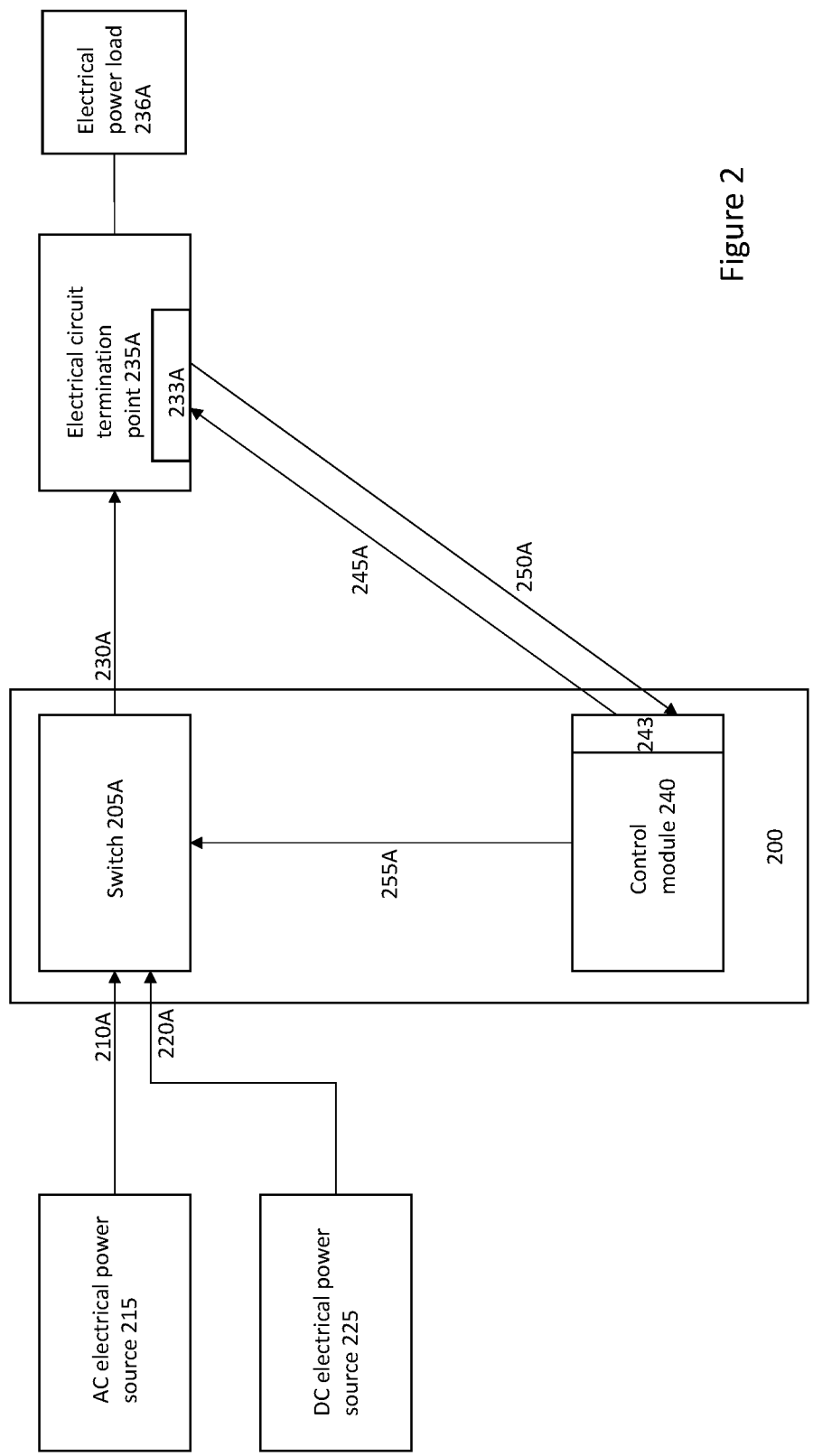
FIG. 2 illustrates an embodiment of the invention with access to an AC electrical power supply and a DC electrical power supply.

With reference to FIG. 2, one embodiment 200 of the invention includes a switch 205A having a first input 210A to couple to an AC electrical power supply or source 215A, a second input 220A to couple to a DC electrical power supply or source 225, and an output 230A to couple to an electrical power load 236A. In various embodiments, the electrical power load is directly connected to an electrical circuit termination point 235A. In such embodiments, the output 230A to couple to an electrical power load 236A is connected to the electrical power termination point 235A, which, in turn, is connected to the electrical power load 236A. An electrical power termination point consists of, but is not limited to, one of: an electrical receptacle, a disconnect switch, a circuit breaker, a junction box, and a branch circuit.

In the embodiment 200, a control module 240 transmits a signal 245A to the electrical power load 236A, or to a device acting on behalf of the electrical power load, such as the electrical circuit termination point 235A, to determine whether the electrical power load uses AC electrical power or DC electrical power. The control module 240 receives from the electrical power load 236, or a device acting on behalf of the electrical power load, such as the electrical circuit termination point 235A, an indication 250A that the electrical power load 236A uses one of AC electrical power and DC electrical power, in response to the transmitted signal 245A. In the embodiment, the physical transmission medium over which signals 245A and 250A are transmitted could be any conventional wired- or wireless transmission medium, using any conventional wired- or wireless signaling or communication protocol. In response to receiving such an indication, the control module 240 transmits a signal 255A to switch 205A to configure the switch 205A to receive electrical power from one of the AC electrical power source 215 and the DC electrical power source 225 and transmit the received electrical power to the electrical power load 236A, responsive to the received indication 250A. For example, in one embodiment, the switch 205A is a single pole multiple throw (SPMT) switch that can at least switch between receiving electrical power from AC electrical power source 215, and receiving electrical power from DC electrical power source 225. In one embodiment, the electrical power load is connected to an electrical circuit termination point 235A, which handles communication with control module 240 on behalf of the electrical power load. In one embodiment, electrical circuit termination point 235A has its own Internet of Things (IoT) interface 233A, via which to communicate with IoT interface 243 of control module 240.

Figure 7:
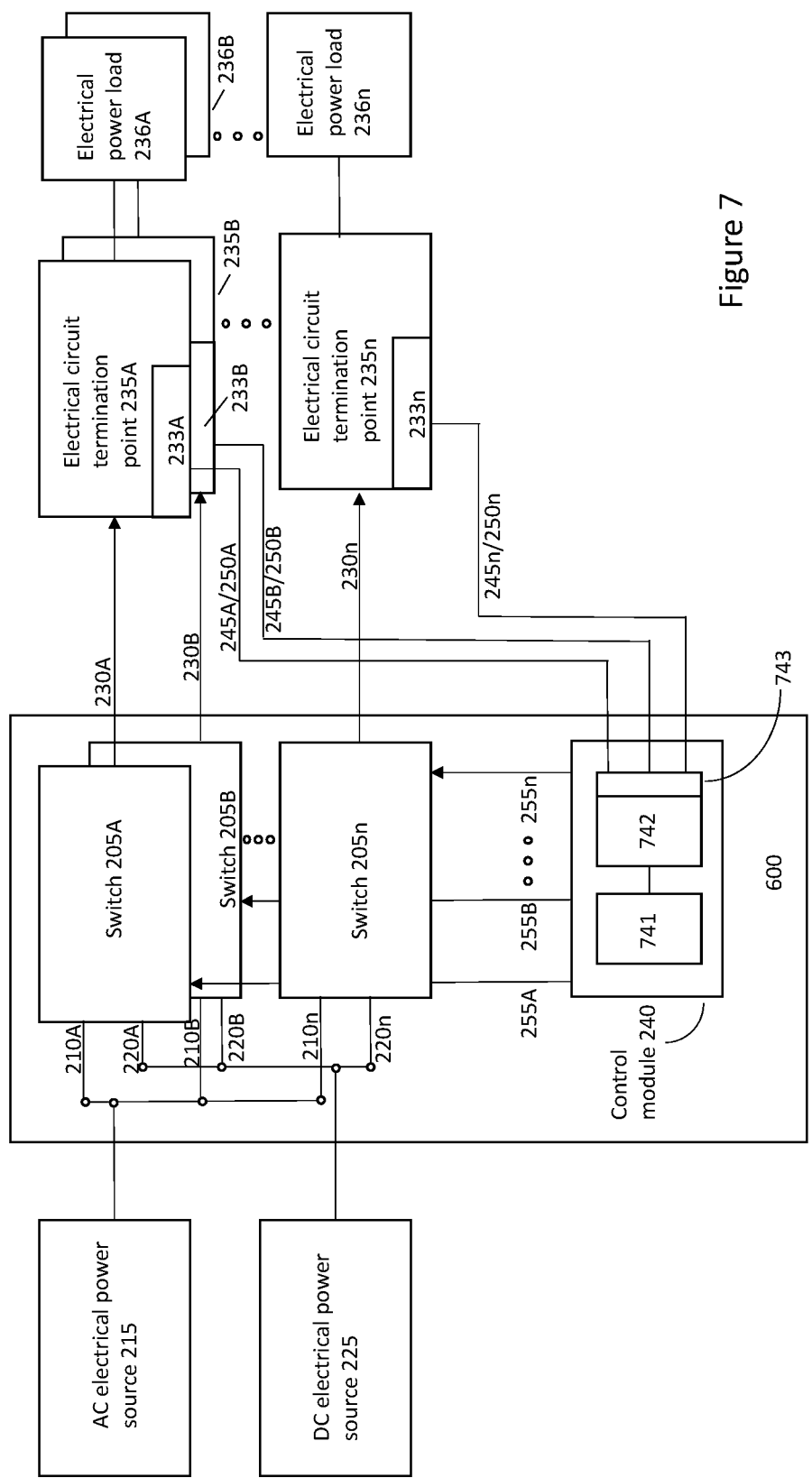
FIG. 7 illustrates another embodiment of the invention as implemented in an electrical power distribution system.

With reference to FIGS. 2 and 7, in one embodiment, the control module 240 comprises an Internet of Things (IoT) interface 243, 743 via which to transmit the signal 245A to the electrical power load 236A to determine whether the electrical power load uses AC electrical power or DC electrical power, and to receive the indication 250A that the electrical power load 236A uses one of AC electrical power and DC electrical power, in response to the transmitted signal 245A. Any one or more of a number of protocols may be employed according to current, de facto, or proposed standards promoted or used by IoT communications for communicating the signals 245A/250A between control module 240 and the electrical power load, including protocols at various layers of the IoT communications model, including infrastructure protocols, identification protocols, transport protocols, discovery protocols, data protocols, device management protocols, etc., as outlined briefly below.

In one embodiment, the IoT interfaces for electrical loads or appliances and/or electrical circuit termination points allow for the appliances to be interrogated through a control line or wireless interface, and information disclosed by such interrogation may include specifications on line voltage, beyond simply whether the appliance operates according to AC electrical power or DC electrical power.

Figure 3:
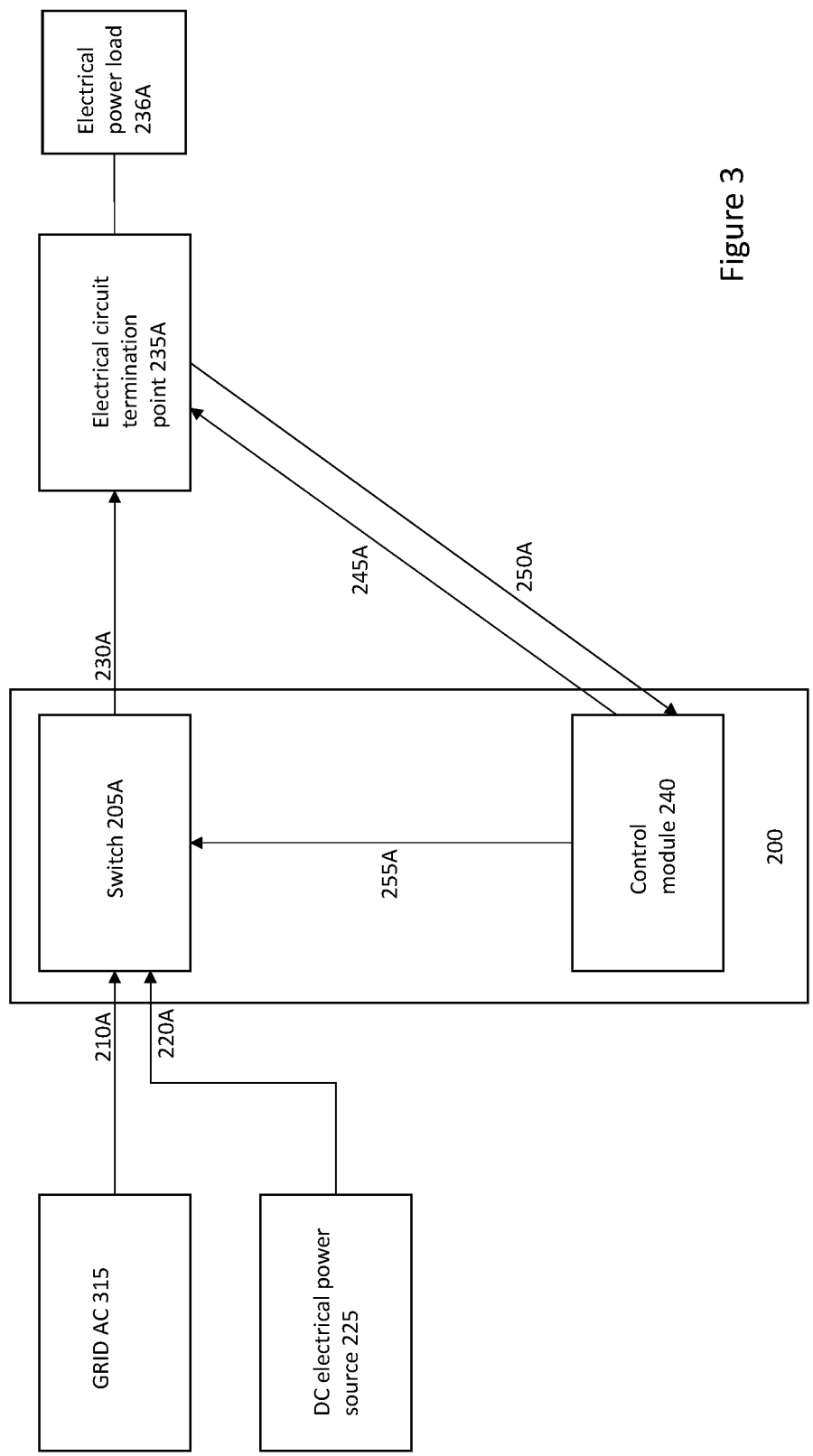
FIG. 3 illustrates an embodiment of the invention with access to an AC electrical power grid and a DC electrical power supply.
Figure 4:
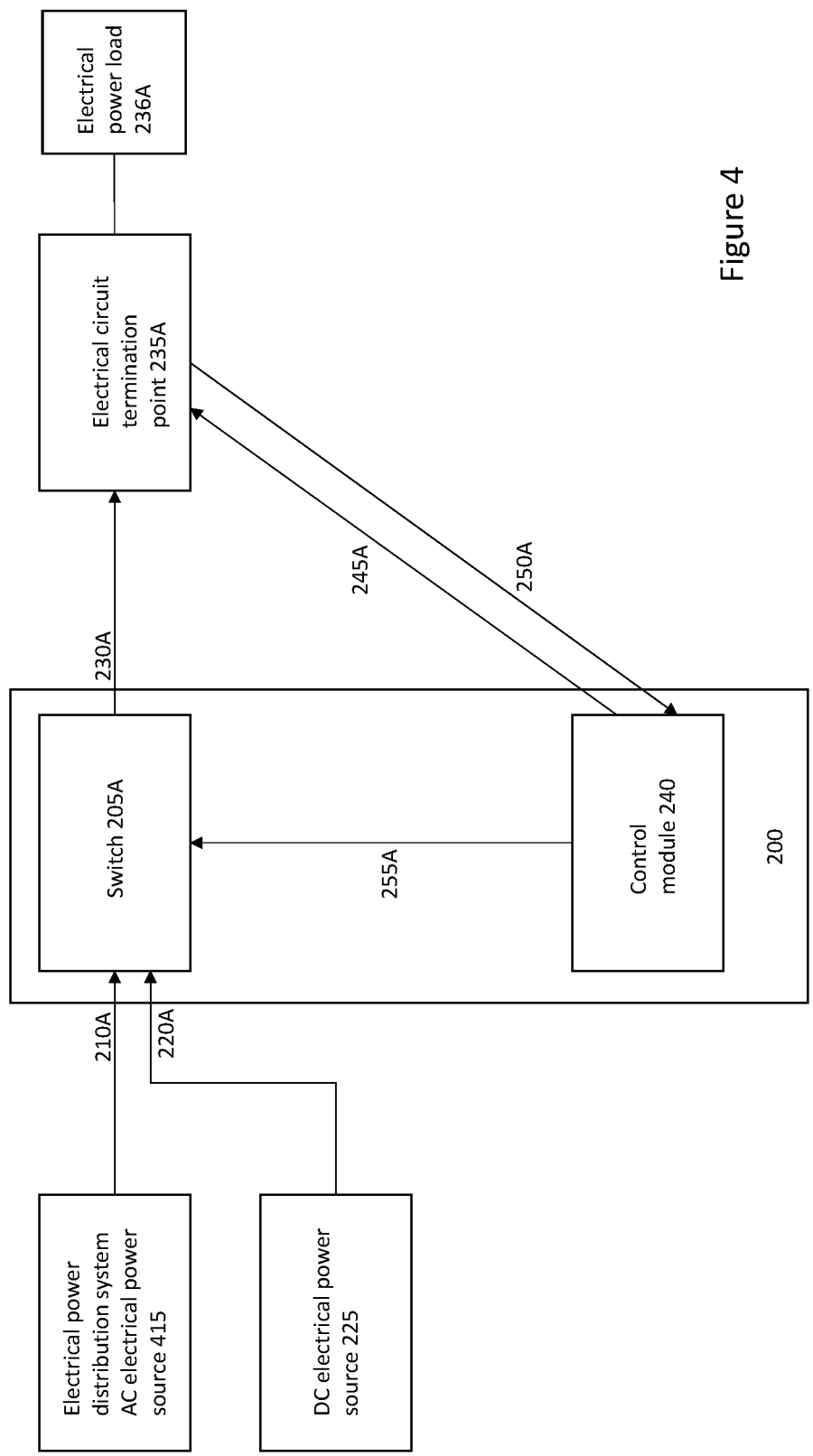
FIG. 4 illustrates an embodiment of the invention with access to an electrical power distribution system providing AC electrical power, and a DC electrical power supply.
Figure 5:
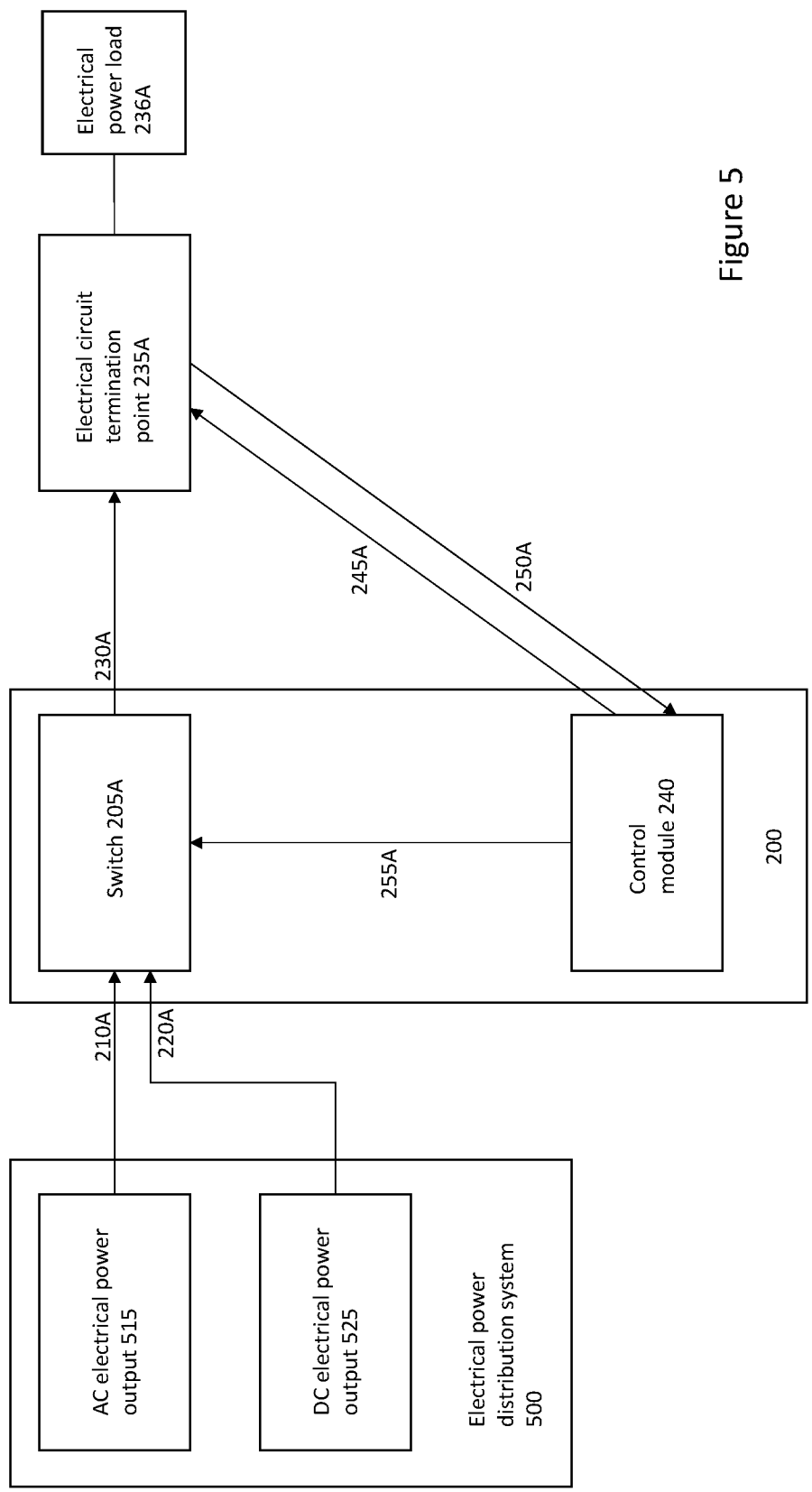
FIG. 5 illustrates an embodiment of the invention with access to an electrical power distribution system providing an AC electrical power supply and a DC electrical power supply.

With reference to FIGS. 3 and 4, in one embodiment, the AC electrical power source is an electrical power grid-based AC electrical power source 315. In another embodiment, an electrical power distribution system provides AC electrical power source 415. In yet another embodiment, with reference to FIG. 5, the AC electrical power source comprises an AC electrical power output 515 of an electrical power distribution system 500 and the DC electrical power source comprises a DC electrical power output 525 of the electrical power distribution system 500.

Figure 6:
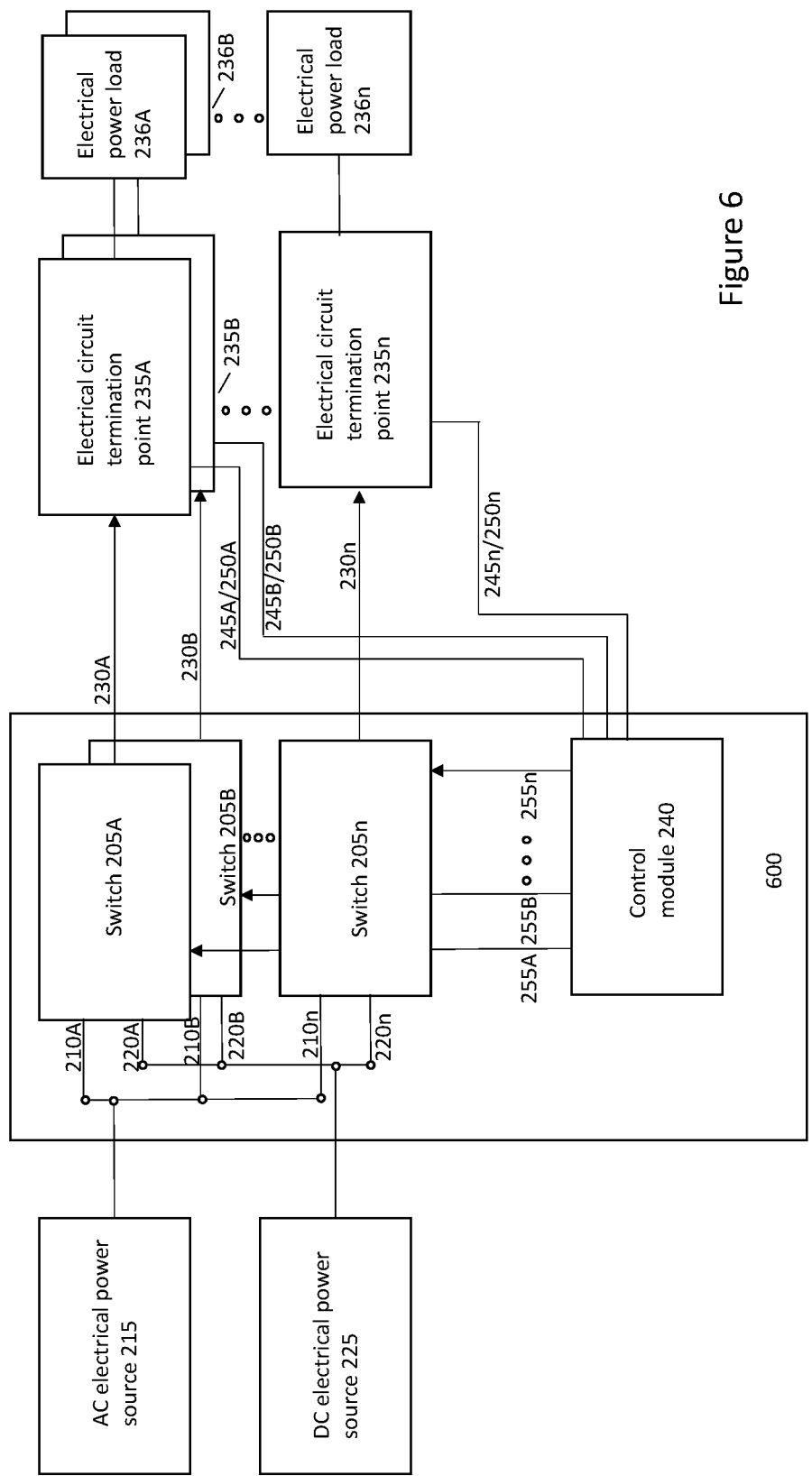
FIG. 6 illustrates an embodiment of the invention as implemented in an electrical power distribution system.

The embodiments described thus far illustrate a single switch 205A capable of being coupled to the AC electrical power source and the DC electrical power source 225, the switch in turn capable of being coupled to a single electrical power load. However, other embodiments of the invention contemplate multiple switches each of which can be connected to one or more AC electrical power sources and/or one or more DC electrical power sources, and further connected to a respective one or more electrical power loads through one or more electrical circuit termination circuits. With such an embodiment in mind, and with reference to FIG. 6, an electrical power distribution system 600 comprises a plurality of switches 205A-205n, each having a respective first input 210A-210n to couple to an AC electrical power source 215, a respective second input 220A-220n to couple to a DC electrical power source 225, and a respective output 230A-230n to couple to a respective one of a plurality of electrical power loads 236A-236n. A single control module 240 transmits a respective signal 245A-245n to each of the plurality of electrical power loads 236A-236n, or respective electrical circuit termination points 235A-235n to which the electrical power loads are connected, to determine whether the respective electrical power load uses AC electrical power or DC electrical power.

The control module 240 in such an embodiment receives from each of the plurality of electrical power loads 236A-236n a respective indication 250A-250n that the electrical power load uses one of AC electrical power and DC electrical power, in response to the transmitted signal 245A-245n. The control module 240 then causes, by way of respective transmitted control signals 255a-255n, each of the plurality of switches 205A-205n to receive electrical power from one of the AC electrical power source 215 and the DC electrical power source 225 and transmit the received electrical power to the respective one of the plurality of electrical power loads 236A-236n, in response to the respective received indication 250A-250n.

With reference to FIG. 7, the electrical power distribution system 600, in one embodiment, includes a control module 240 that comprises a controller 741 and a signal transceiver 742 coupled to the controller. In such an embodiment, the controller 741 controls the signal transceiver 742 to transmit the signals 245A-245n to the plurality of electrical power loads 236A-236n to determine whether the electrical power loads use AC electrical power or DC electrical power.

The signal transceiver 742 receives from each of the plurality of electrical power loads 236A-236n a respective indication 250A-250n that the electrical power load uses one of AC electrical power and DC electrical power, in response to the transmitted signal 245A-245n. The controller 741, in turn, receives the indication 250A-250n from the signal transceiver and causes each of the plurality of switches 205A-205n to receive electrical power from one of the AC electrical power source 215 and the DC electrical power source 225 and transmit the received electrical power to the respective one of the plurality of electrical power loads 236A-236n, in response to the respective received indication 250A-250n.

Figure 8:
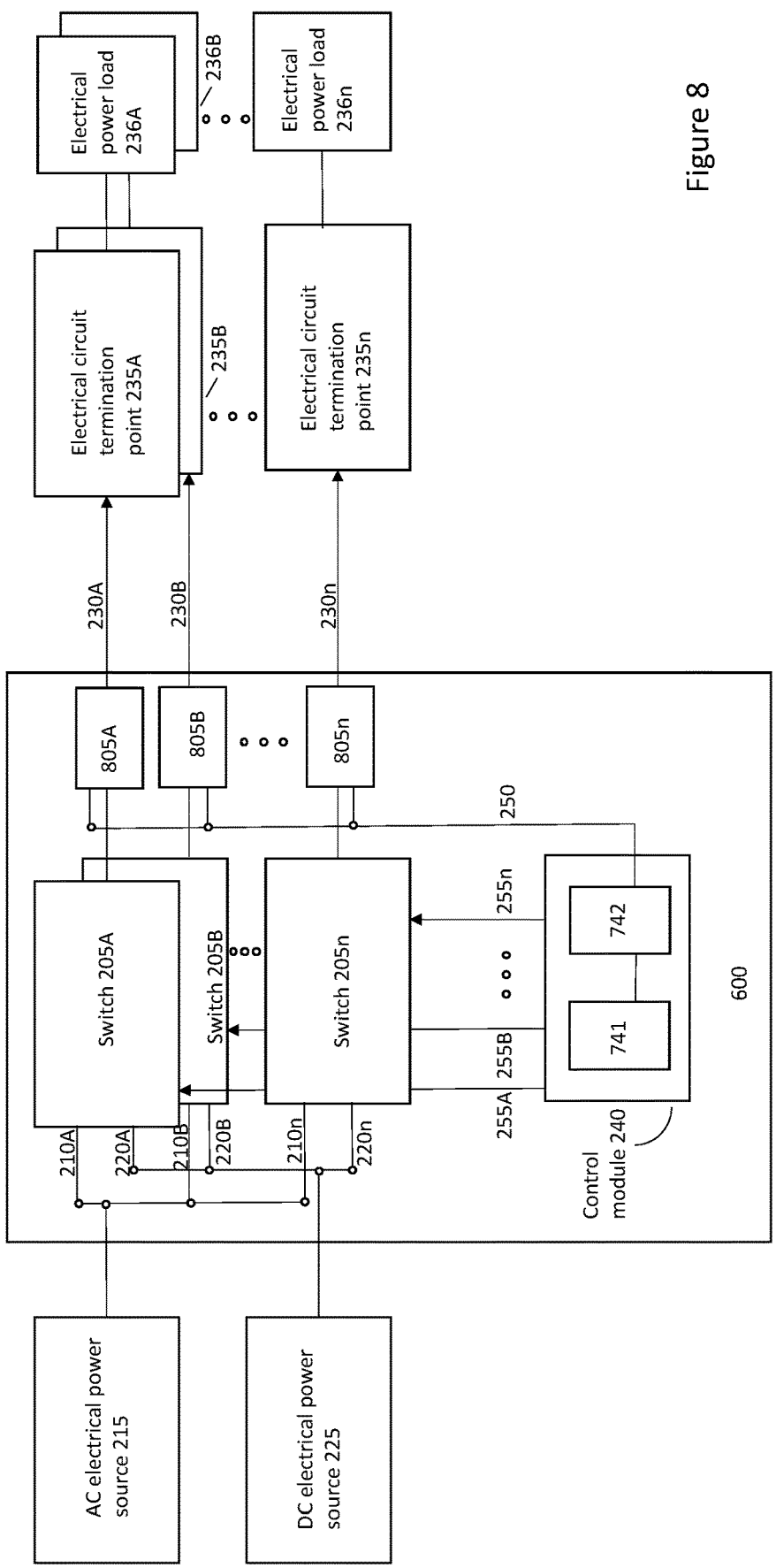
FIG. 8 illustrates yet another embodiment of the invention as implemented in an electrical power distribution system.

With reference to FIG. 8, the electrical power distribution system 600, in one embodiment, includes a plurality of current sensors 805A-805n each coupled in-line, that is, to the electrical transmission wiring, between a respective one of the plurality of switches 205A-205n and a corresponding one of the plurality of electrical power loads (or a corresponding one of the electrical circuit termination points 235A-235n front-ending the loads). In such an embodiment, the control module 240 causes each switch 205A-205n (e.g., by way of respective signals generated by signal generator/transceiver 742 and provided as indicated at lines 255A-255n to each switch) to transmit an electrical signal to each electrical power load over respective lines 230A-230n, and receives a respective indication 250A-250n from a respective current sensor 805A-805n that the corresponding electrical power load 236A-236n uses one of AC electrical power and DC electrical power, in response to the transmitted signal. In particular, the respective current sensor 805A-805n senses current flow or the absence thereof in response to transmission of the electrical signal, which indicates the corresponding electrical power load 236A-236n uses one of AC electrical power and DC electrical power and transmits the respective indication 250A-250n to the control module 240 in response thereto. A common bus, or single line, 250 is illustrated in FIG. 8. Thus, in one embodiment, for control module 240 to identify from which current sensor 805A-805n a particular one of the indications 250A-250n is transmitted, an addressing scheme may be employed whereby the source of the indication is identified by an address. In another embodiment, multiple, separate, control lines, each dedicated to a different current sensor and coupled to different inputs on the control module 240, may be used so that the source of the indication is essentially hard-wired.

While some of the embodiments of the invention described herein perform an electrical load detection algorithm using pulses from a signal generator, it is appreciated by those skilled in the art that the signal generator may produce alternative interrogative waveforms. Furthermore, the signal generator may be realized and/or integrated via various forms of digital and/or analog circuitry including a microprocessor or microcontroller. Furthermore, the signal generator may have current limiting capability to protect the electrical loads against breakdown from applying excessive, and in particular, excessive negative, voltages.

Figure 9:
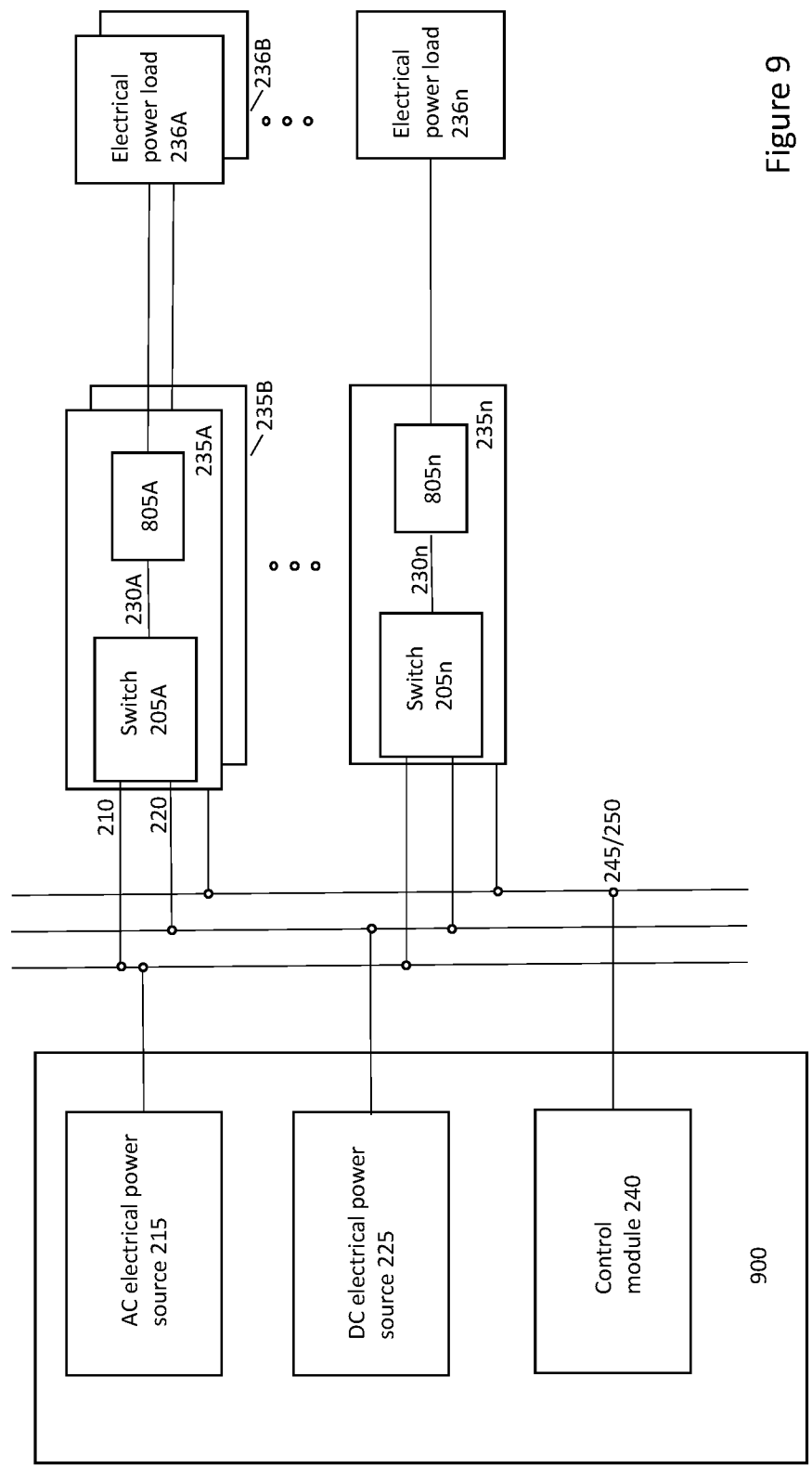
FIG. 9 illustrates an embodiment of the invention implemented in an electrical power distribution system and a plurality of electrical power termination points.

FIG. 9 illustrates an embodiment of the invention in which a plurality of electrical power termination points 235A-235n each have a respective switch 205A-205n. In each case, the switch has a first input 210 to couple to the AC electrical power source 215, a second input 220 to couple to the DC electrical power source 225, and an output 230 to couple to a respective one of a plurality of electrical power loads 236A-236n. A separate electrical power distribution system 900 includes the AC electrical power source 215, the DC electrical power source 225, and the control module 240 to transmit a respective signal 245A-245n to each of the plurality of electrical power loads 236A-236n to determine whether the electrical power load uses AC electrical power or DC electrical power. In such an embodiment, the control module 240 receives from each of the plurality of electrical power loads 236A-236n a respective indication 250A-250n that the electrical power load uses one of AC electrical power and DC electrical power, in response to the transmitted signal 245A-245n, and causes each of the plurality of switches 205A-205n to receive electrical power from one of the AC electrical power source 215 and the DC electrical power source 225 and transmit the received electrical power to the respective one of the plurality of electrical power loads 236A-236n, responsive to the respective received indication 250A-250n.

Figure 10:
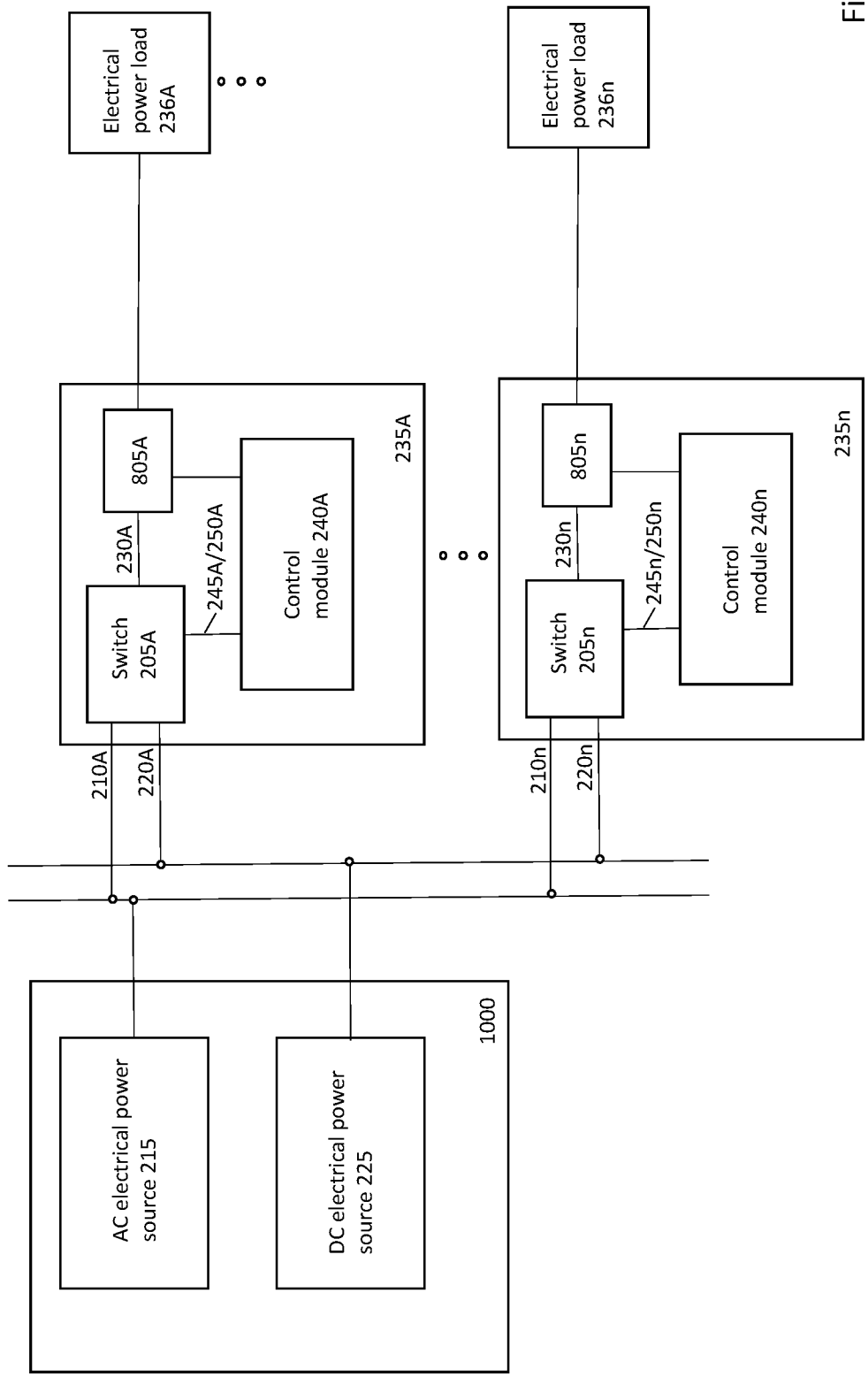
FIG. 10 illustrates another embodiment of the invention implemented in an electrical power distribution system and a plurality of electrical power termination points.

With reference to FIG. 10, one embodiment of the invention contemplates each of the plurality of electrical power termination points 235A-235n including a respective switch 205A-205n, with respective first inputs 210A-210n to couple to the AC electrical power source 215, respective second inputs 220A-220n to couple to the DC electrical power source 225, and respective outputs 230 to couple to a respective one of a plurality of electrical power loads 236A-236n. In such an embodiment, each electrical power termination point includes a respective control module 240A-240n to transmit a respective signal 245A-245n to the respective one of the plurality of electrical power loads 236A to determine whether the electrical power load uses AC electrical power or DC electrical power. The control module receives from each of the plurality of electrical power loads 236A-236n a respective indication 250A-250n that the electrical power load uses one of AC electrical power and DC electrical power, in response to the transmitted signal 245A-245n, and causes the respective switch 205A-205n to receive electrical power from one of the AC electrical power source 215 and the DC electrical power source 225 and transmit the received electrical power to the respective one of the plurality of electrical power loads 236A-236n, responsive to the respective received indication 250A-250n. In this embodiment, an electrical power distribution system 100 may include the AC electrical power source 215 and the DC electrical power source 225.

Figure 11:
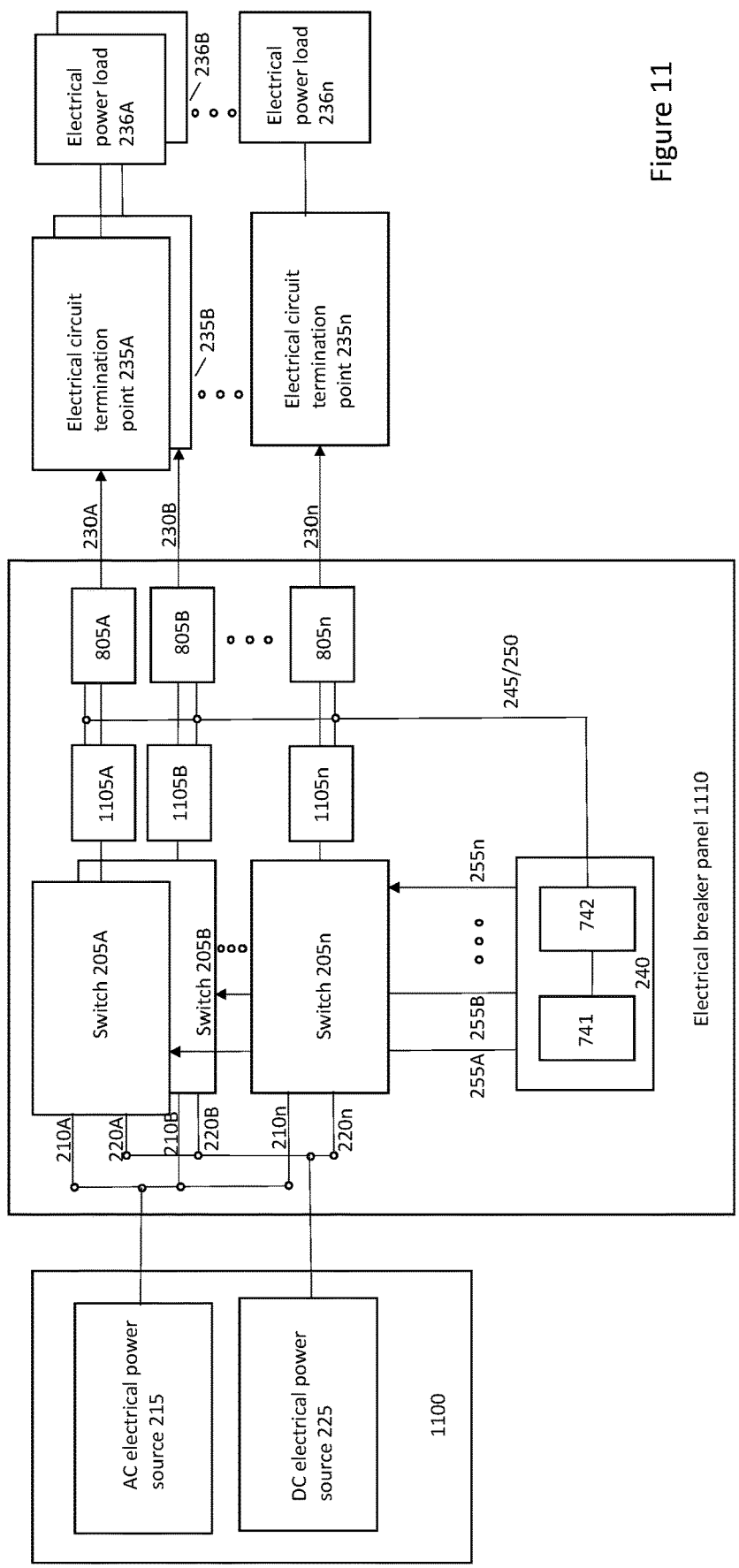
FIG. 11 illustrates an embodiment of the invention implemented in an electrical power distribution system and a circuit breaker panel.

FIG. 11 illustrates an embodiment in which an electrical circuit breaker panel 1110 houses the switches, the control module 240, and current sensors 805A-805n. In one embodiment, a respective circuit breaker 1105A-1105n is coupled between respective switches 205A-205n and current sensors 805A-805n. The embodiment may optionally couple to an electrical power distribution system 1100 that provides an AC electrical power source 215 and a DC electrical power source 225.

Figure 12:
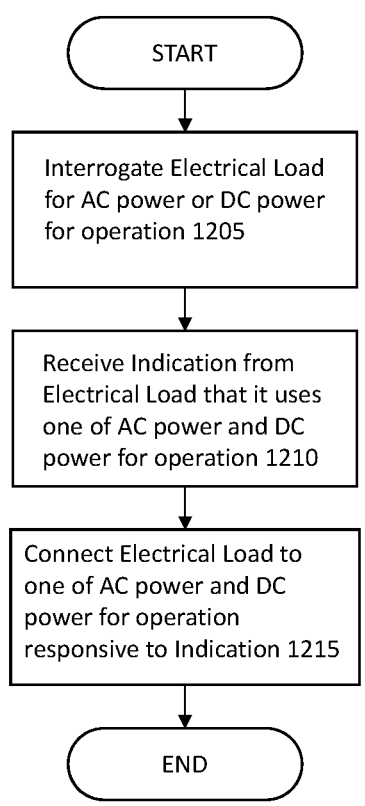
FIG. 12 is a flow diagram of a method in accordance with an embodiment of the invention.

With reference to FIG. 12, a method of operation in accordance with an embodiment of the invention is described. The embodiment involves interrogating at 1205 the electrical load or the electrical circuit termination point to determine whether the load uses or requires AC electrical power or DC electrical power for normal operation. The load may be from a single receptacle/electrical circuit termination point or from a circuit feeding a plurality of electrical termination points. In the situation where it is a circuit then it is presumed that all of the loads on that circuit are of the same type, e.g., either all AC electrical loads or all DC electrical loads. Many of the embodiments described herein assume that there are only two choices for line voltage: one VDC line and one VAC line. It is appreciated by those skilled in the art, however, that there may be more than two choices available. At 1210, the embodiment receives an indication in response to the interrogation as to whether the load uses AC or DC electrical power, and then connects at 1215 the electrical load to the correct power supply—either an AC electrical power supply or source, or a DC electrical power supply or source, responsive to the received indication, at the required voltage and phases. Note that the line voltage may be provided by an electrical power distribution system, an electrical power router system, or the AC line voltage from an AC power grid.

Figure 13:
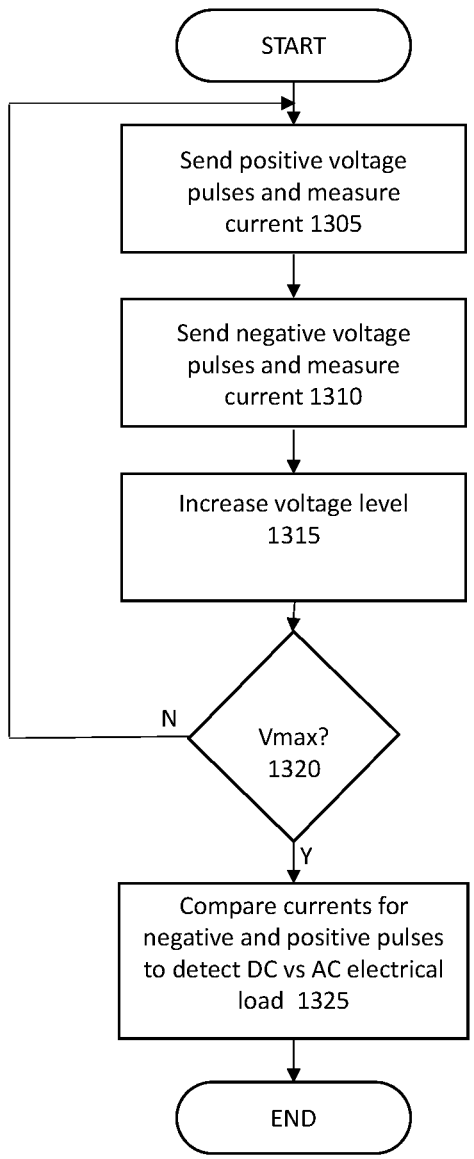
FIG. 13 is a flow diagram of a method in accordance with one embodiment of the invention.

In particular, and with reference to FIG. 13, in one embodiment 1300, the control module 240 transmits a signal 245A to the electrical power load 236A to determine whether the electrical power load uses AC electrical power or DC electrical power by transmitting a plurality of positive voltage pulses at 1305, and a plurality of negative voltage pulses at 1310, to the electrical load. Current sensors 805 measure the current flow in each instance, and the process repeats, after increasing the voltage level of the pulses at 1315, until Vmax or at minimum voltage threshold is reached at 1320. After the series of pulses have been transmitted and the corresponding measurements have been made, the embodiment compares the measured currents for the negative and positive voltage pulses and determines, based on such, whether the electrical load is a DC electrical load or an AC electrical load. In one embodiment, if the currents measured during the positive voltage pulses are asymmetric (or substantially asymmetric) relative to the currents measured during the negative voltage pulses, then the embodiment concludes the electrical load is a DC electrical load. On the other hand, if the currents measured during the positive voltage pulses are symmetric (or substantially symmetric) relative to the currents measured during the negative voltage pulses, then the embodiment concludes the electrical load is an AC electrical load.

In one embodiment, the control module starts the process 1300 by sending a series of small positive pulses, e.g., at 0.1 volts amplitude for a short duration of time, e.g., 10 msec, at intervals of, for example, 100 msec, and the current flow is measured, either during the pulses or as an average. The embodiment then sends a series of small negative pulses, e.g., at 0.1 volts amplitude for a short duration of time, e.g., 10 msec, at intervals of, for example, 100 msec, and the current flow is measured, either during the pulses or as an average. This process can be repeated after increasing the voltage, for example, in increments of 0.1 volts, until a maximum voltage, Vmax, is reached, where Vmax is, for example, a predetermined maximum voltage tolerable for DC electrical loads, most notably for the case of applying a negative Vmax to a DC load. The embodiment then compares the measured currents for the negative pulses and the positive pulses, and if they are symmetric, or substantially so, with respect to each other, then the load is considered an AC electrical load. However, if the measured currents for the negative pulses and the positive pulses are asymmetric, or substantially so, with respect to each other, then the load is considered to be a DC electrical load.

Figure 14:
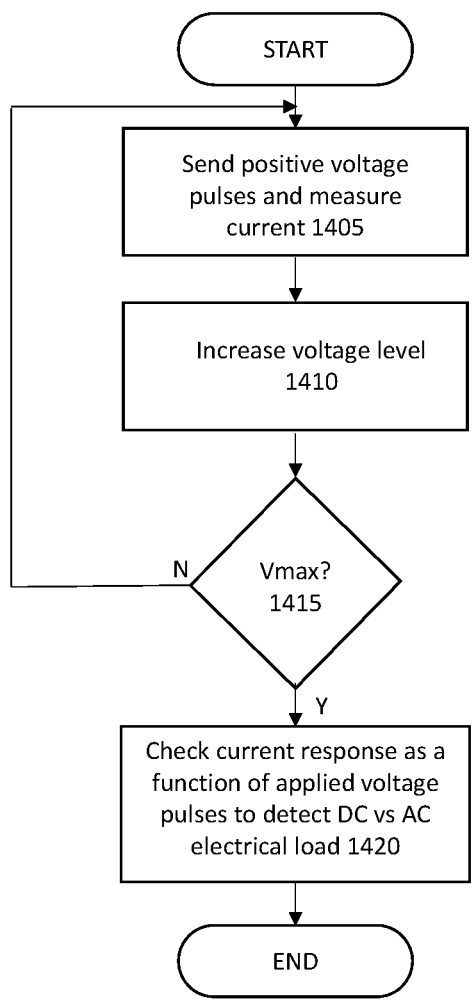
FIG. 14 is a flow diagram of a method in accordance with another embodiment of the invention.

In another embodiment 1400, with reference to FIG. 14, the control module 240 transmits a plurality of positive voltage pulses at 1405 to the electrical load. Current sensor 805 measures the current flow in each instance, and the process repeats, after increasing the voltage level of the pulses at 1410, until Vmax or at minimum voltage threshold is reached at 1415. After the series of pulses have been transmitted and the corresponding measurements have been made, the embodiment checks at 1420 the current response as a function of the applied voltage pluses and, based on such, detects whether the electrical load is a DC electrical load or an AC electrical load. In one embodiment, the current response to positive pulses as a function of pulse amplitude is nonlinear, that is, the current flow in response to a DC electrical load will be low or nearly zero at low voltage amplitudes and will increase, abruptly, once the applied voltage is above a minimum voltage threshold.

In one embodiment, the control module starts by sending a series of small positive pulses, e.g., at 0.1 volts amplitude for a short duration of time, e.g., 10 msec, at intervals of, for example, 100 msec, and the current flow is measured, either during the pulses or as an average. This process can be repeated after increasing the voltage, for example, in increments of 0.1 volts until a maximum voltage, Vmax, is reached, where Vmax is, for example, a predetermined maximum voltage tolerable for DC electrical loads. The embodiment then reviews the current response as a function of the applied voltage pulses, and if the current response shows a nonlinear signature, e.g., little or no current is detected at low voltages followed by an abrupt or significant increase in current over a threshold voltage, then the embodiment considers the electrical load to be a DC electrical load. However, if the current response shows a linear signature, or substantially so, then the embodiment considers the electrical load to be an AC electrical load.

The Internet of Things (IoT) protocols that interfaces 233A-233N, 243, and 273 may use legacy, new, and emerging communication protocols that allow devices (e.g., 235A-235n) and servers (e.g., control module 240) to communicate. Such protocols may be categorized into the following layers:

Infrastructure (ex: 6LowPAN, IPv4/IPv6, RPL);
Identification (ex: EPC, uCode, IPv6, URIs);
Comms/Transport (ex: Wifi, Bluetooth, LPWAN);
Discovery (ex: Physical Web, mDNS, DNS-SD);
Data Protocols (ex: MQTT, CoAP, AMQP, Websocket, Node);
Device Management (ex: TR-069, OMA-DM);
Semantic (ex: JSON-LD, Web Thing Model);
Multi-layer Frameworks (ex: Alljoyn, IoTivity, Weave, Homekit);
Security; and
Industry Vertical (Connected Home, Industrial, etc).
Infrastructure IPv6—an Internet Layer protocol for packet-switched internetworking and provides end-to-end datagram transmission across multiple IP networks.

6LoWPAN—an acronym of IPv6 over Low power Wireless Personal Area Networks. It is an adaption layer for IPv6 over IEEE802.15.4 links. This protocol operates only in the 2.4 GHz frequency range with 250 kbps transfer rate.

UDP (User Datagram Protocol)—A simple OSI transport layer protocol for client/server network applications based on Internet Protocol (IP).

QUIC (Quick UDP Internet Connections, pronounced quick) supports a set of multiplexed connections between two endpoints over User Datagram Protocol (UDP), and was designed to provide security protection equivalent to TLS/SSL, along with reduced connection and transport latency, and bandwidth estimation in each direction to avoid congestion.

Aeron—Efficient reliable UDP unicast, UDP multicast, and IPC message transport.

uIP—an open source TCP/IP stack capable of being used with tiny 8- and 16-bit microcontrollers, licensed under a BSD style license, and further developed by a wide group of developers.

DTLS (Datagram Transport Layer)—The DTLS protocol provides communications privacy for datagram protocols. The protocol allows client/server applications to communicate in a way that is designed to prevent eavesdropping, tampering, or message forgery. The DTLS protocol is based on the Transport Layer Security (TLS) protocol and provides equivalent security guarantees.

ROLL/RPL—(IPv6 routing for low power/lossy networks)

NanoIP—nano Internet Protocol, provides Internet-like networking services to embedded and sensor devices, without the overhead of TCP/IP. NanoIP was designed with minimal overheads, wireless networking, and local addressing.

Content-Centric Networking (CCN)—directly routes and delivers named pieces of content at the packet level of the network, enabling automatic and application-neutral caching in memory wherever it's located in the network.

Time Synchronized Mesh Protocol (TSMP)—a communications protocol for self-organizing networks of wireless devices called motes. TSMP devices stay synchronized to each other and communicate in timeslots, similar to other TDM (time-division multiplexing) systems.

Discovery mDNS (multicast Domain Name System)—Resolves host names to IP addresses within small networks that do not include a local name server.

Physical Web—The Physical Web enables one to view a list of URLs being broadcast by objects in the environment around you with a Bluetooth Low Energy (BLE) beacon.

HyperCat—An open, lightweight JSON-based hypermedia catalogue format for exposing collections of URIs.

UPnP (Universal Plug and Play)—a set of networking protocols that permits networked devices to seamlessly discover each other's presence on the network and establish functional network services for data sharing, communications, and entertainment.

Data Protocols

MQTT (Message Queuing Telemetry Transport)—enables a publish/subscribe messaging model in a lightweight way. It is useful for connections with remote locations where a small code footprint is required and/or network bandwidth is at a premium.

CoAP (Constrained Application Protocol)—an application layer protocol that is intended for use in resource-constrained internet devices, such as WSN nodes. CoAP is designed to translate to HTTP for integration with the web, while also meeting requirements such as multicast support, low overhead, and simplicity. The CoRE group has proposed the following features for CoAP: RESTful protocol design minimizing the complexity of mapping with HTTP, low header overhead and parsing complexity, URI and content-type support, support for the discovery of resources provided by known CoAP services. Simple subscription for a resource, and resulting push notifications, Simple caching based on max-age.

SMCP—A C-based CoAP stack which is suitable for embedded environments. Features include support draft-ietf-core-coap-13, fully asynchronous I/O, supports both BSD sockets and UIP.

STOMP—The Simple Text Oriented Messaging Protocol.

XMPP (Extensible Messaging and Presence Protocol)—an open technology for real-time communication, which powers applications including instant messaging, presence, multi-party chat, voice and video calls, collaboration, lightweight middleware, content syndication, and generalized routing of XML data.

Mihini/M3DA—Mihini agent is a software component that acts as a mediator between an M2M server and the applications running on an embedded gateway. M3DA is a protocol optimized for the transport of binary M2M data. It is made available in the Mihini project both for means of device management, by easing the manipulation and synchronization of a device's data model, and for means of asset management, by allowing user applications to exchange typed data/commands back and forth with an M2M server, in a way that optimizes the use of bandwidth.

AMQP (Advanced Message Queuing Protocol)—an open standard application layer protocol for message-oriented middleware. The defining features of AMQP are message orientation, queuing, routing (including point-to-point and publish-and-subscribe), reliability and security.

LLAP (lightweight local automation protocol)—a short message that is sent between intelligent objects using normal text. LLAP can run over any communication medium.

LWM2M (Lightweight M2M)—Lightweight M2M (LWM2M) is a system standard in the Open Mobile Alliance. It includes DTLS, CoAP, Block, Observe, SenML and Resource Directory and weaves them into a device-server interface along with an Object structure.

SSI (Simple Sensor Interface)—a simple communications protocol designed for data transfer between computers or user terminals and smart sensors.

Reactive Streams—a standard for asynchronous stream processing with non-blocking back pressure on the JVM.

ONS 2.0

REST (Representational state transfer)—RESTful HTTP

Communication/Transport layer

Ethernet.

WirelessHart—provides a robust wireless protocol for the full range of process measurement, control, and asset management applications.

DigiMesh—a proprietary peer-to-peer networking topology for use in wireless end-point connectivity solutions.

ISA100.11a—a wireless networking technology standard developed by the International Society of Automation (ISA). The official description is "Wireless Systems for Industrial Automation: Process Control and Related Application"

IEEE 802.15.4—a standard which specifies the physical layer and media access control for low-rate wireless personal area networks (LR-WPANs). It is maintained by the IEEE 802.15 working group. It is the basis for the ZigBee, ISA100.11a, Wireless HART, and MiWi specifications, each of which further extends the standard by developing the upper layers which are not defined in IEEE 802.15.4. Alternatively, it can be used with 6LoWPAN and standard Internet protocols to build a wireless embedded Internet.

NFC—based on the standard ISO/IEC 18092:2004, using inductive coupled devices at a center frequency of 13.56 MHz. The data rate is up to 424 kbps and the range is with a few meters short compared to the wireless sensor networks.

ANT—a proprietary wireless sensor network technology featuring a wireless communications protocol stack that enables semiconductor radios operating in the 2.4 GHz Industrial, Scientific and Medical allocation of the RF spectrum ("ISM band") to communicate by establishing standard rules for co-existence, data representation, signaling, authentication and error detection.

Bluetooth—works in the 2.4 GHz ISM band and uses frequency hopping. With a data rate up to 3 Mbps and maximum range of 100 m. Each application type which can use Bluetooth has its own profile.

Eddystone—a protocol specification that defines a Bluetooth low energy (BLE) message format for proximity beacon messages.

ZigBee—uses the 802.15.4 standard and operates in the 2.4 GHz frequency range with 250 kbps. The maximum number of nodes in the network is 1024 with a range up to 200 meter. ZigBee can use 128 bit AES encryption.

EnOcean—EnOcean is a an energy harvesting wireless technology which works in the frequencies of 868 MHz for Europe and 315 MHz for North America. The transmit range goes up to 30 meter in buildings and up to 300 meter outdoors.

WiFi.

WiMax—based on the standard IEEE 802.16 and is intended for wireless metropolitan area networks. The range is different for fixed stations, where it can go up to 50 km and mobile devices with 5 to 15 km. WiMAx operates at frequencies between 2.5 GHz to 5.8 GHz with a transfer rate of 40 Mbps.

LPWAN

Weightless—a proposed proprietary open wireless technology standard for exchanging data between a base station and thousands of machines around it (using wavelength radio transmissions in unoccupied TV transmission channels) with high levels of security.

NB-IoT (Narrow-Band IoT)—technology being standardized by the 3GPP standards body.

LTE-MTC (LTE-Machine Type Communication)—standards-based family of technologies supports several technology categories, such as Cat-1 and CatM1, suitable for the IoT.

EC-GSM-IoT (Extended Coverage-GSM-IoT)—enables new capabilities of existing cellular networks for LPWA (Low Power Wide Area) IoT applications. EC-GSM-IoT can be activated through new software deployed over a very large GSM footprint, adding even more coverage to serve IoT devices.

LoRaWAN—Network protocol intended for wireless battery operated Things in regional, national or global network.

RPMA (Random phase multiple access) A technology communication system employing direct-sequence spread spectrum (DSSS) with multiple access.

Cellular—GPRS/2G/3G/4G cellular.

Semantic

IOTDB—JSON/Linked Data standards for describing the Internet of Things.

SensorML—provides standard models and an XML encoding for describing sensors and measurement processes.

Semantic Sensor Net Ontology—W3C—describes sensors and observations, and related concepts. It does not describe domain concepts, time, locations, etc. these are intended to be included from other ontologies via OWL imports.

Wolfram Language—Connected Devices—A symbolic representation of each device. Then there are a standard set of Wolfram Language functions like DeviceRead, DeviceExecute, DeviceReadBuffer and DeviceReadTimeSeries that perform operations related to the device.

RAML (RESTful API Modeling Language)—makes it easy to manage the whole API lifecycle from design to sharing.

SENML (Media Types for Sensor Markup Language)—A simple sensor, such as a temperature sensor, could use this media type in protocols such as HTTP or CoAP to transport the measurements of the sensor or to be configured.

LsDL (Lemonbeat smart Device Language)—XML-based device language for service oriented devices Multi-Layer Frameworks Alljoyn—An open source software framework that makes it easy for devices and apps to discover and communicate with each other.

IoTivity is an open source project hosted by the Linux Foundation, and sponsored by the OIC.

IEEE P2413—Standard for an Architectural Framework for the Internet of Things (IoT)

Thread—Built on open standards and IPv6 technology with 6LoWPAN as its foundation.

IPSO Application Framework—defines sets of REST interfaces that may be used by a smart object to represent its available resources, interact with other smart objects and backend services. This framework is designed to be complementary to existing Web profiles including SEP2 and oBIX.

OMA LightweightM2M v1.0—fast deployable client-server specification to provide machine to machine service. A device management protocol, designed to be able to extend to meet the requirements of applications. LightweightM2M is not restricted to device management, it should be able transfer service/application data.

Weave—A communications platform for IoT devices that enables device setup, phone-to-device-to-cloud communication, and user interaction from mobile devices and the web.

Telehash—JSON+UDP+DHT=Freedom—a secure wire protocol powering a decentralized overlay network for apps and devices.

Security

Open Trust Protocol (OTrP)—A protocol to install, update, and delete applications and to manage security configuration in a Trusted Execution Environment (TEE).

X.509—Standard for public key infrastructure (PKI) to manage digital certificates and public-key encryption. A key part of the Transport Layer Security protocol used to secure web and email communication.

Vertical Specific

IEEE 1451—a family of Smart Transducer Interface Standards, describes a set of open, common, network-independent communication interfaces for connecting transducers (sensors or actuators) to microprocessors, instrumentation systems, and control/field networks.

IEEE 1888.3-2013—IEEE Standard for Ubiquitous Green Community Control Network: Security.

IEEE 1905.1-2013—IEEE Standard for a Convergent Digital Home Network for Heterogeneous Technologies.

IEEE 802.16p-2012—IEEE Standard for Air Interface for Broadband Wireless Access Systems.

IEEE 1377-2012—IEEE Standard for Utility Industry Metering Communication Protocol Application Layer.

IEEE P1828—Standard for Systems With Virtual Components.

IEEE P1856—Standard Framework for Prognostics and Health Management of Electronic Systems.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

What is claimed is:

1. An apparatus, comprising:
   a switch having a first input to couple to an AC electrical power source, a second input to couple to a DC electrical power source, and an output to couple to an electrical power load;
   a control module to transmit a plurality of positive voltage pulses and a plurality of negative voltage pulses to the electrical power load to determine whether the electrical power load uses AC electrical power or DC electrical power;

the control module to detect the electrical power load uses one of AC electrical power and DC electrical power by:
  measuring an electrical current flow to the electrical power load each transmission of a positive voltage pulse and a negative voltage pulse;
  comparing the electrical current flows associated with the positive voltage pulses with the electrical current flows associated with the negative voltage pulses;
  detecting the electrical power load uses AC electrical power when the electrical current flows associated with the positive voltage pulses are essentially symmetrical with the electrical current flows associated with the negative voltage pulses; and
  detecting the electrical power load uses DC electrical power when the electrical current flows associated with the positive voltage pulses are essentially asymmetrical with the electrical current flows associated with the negative voltage pulses; and
the control module to transmit a signal to the switch to configure the switch to receive electrical power from one of the AC electrical power source and the DC electrical power source and transmit the received electrical power to the electrical power load, responsive to the detection.

2. The apparatus of claim 1, wherein the output to couple to an electrical power load comprises the output to couple to an electrical power termination point which in turn is coupled to the electrical power load, wherein the electrical power termination point is selected from a group consisting of: an electrical receptacle, a disconnect switch, a circuit breaker, a junction box, and a branch circuit.

3. The apparatus of claim 1, wherein the control module comprises an Internet of Things (IoT) interface via which to transmit the plurality of positive voltage pulses and a plurality of negative voltage pulses to the electrical power load to determine whether the electrical power load uses AC electrical power or DC electrical power, and to detect the electrical power load uses one of AC electrical power and DC electrical power based on an electrical current flow associated with the plurality of positive voltage pulses and a plurality of negative voltage pulses transmitted to the electrical power load.

4. The apparatus of claim 1, wherein the AC electrical power source is selected from a group consisting of an electrical power grid AC electrical power source, and an electrical power distribution system AC electrical power source.

5. The apparatus of claim 1, wherein the AC electrical power source comprises an AC electrical power output of an electrical power distribution system and the DC electrical power source comprises a DC electrical power output of the electrical power distribution system.

6. An apparatus, comprising:
switching logic having a first input to couple to an AC electrical power source, a second input to couple to a DC electrical power source, and an output to couple to an electrical power load;
means for detecting the electrical power load uses one of AC electrical power and DC electrical power based on an electrical current flow associated with a plurality of positive voltage pulses and a plurality of negative voltage pulses transmitted to the electrical power load, comprising:
  means for measuring an electrical current flow to the electrical power load each transmission of a positive voltage pulse and a negative voltage pulse;
  means for comparing the electrical current flows associated with the positive voltage pulses with the electrical current flows associated with the negative voltage pulses;
  means for detecting the electrical power load uses AC electrical power when the electrical current flows associated with the positive voltage pulses are essentially symmetrical with the electrical current flows associated with the negative voltage pulses; and
  means for detecting the electrical power load uses DC electrical power when the electrical current flows associated with the positive voltage pulses are essentially asymmetrical with the electrical current flows associated with the negative voltage pulses; and
means for controlling the switching logic to receive electrical power from the AC electrical power source or the DC electrical power source responsive to the means for detecting the electrical power load uses one of AC electrical power and DC electrical power.

7. An apparatus, comprising:
a switch having a first input to couple to an AC electrical power source, a second input to couple to a DC electrical power source, and an output to couple to an electrical power load;
a control module to transmit a plurality of increasingly larger positive voltage pulses to the electrical power load to determine whether the electrical power load uses AC electrical power or DC electrical power;
the control module to detect the electrical power load uses one of AC electrical power and DC electrical power by:
  measuring an electrical current flow to the electrical power load each transmission of a positive voltage pulse;
  detecting the electrical power load uses AC electrical power when the electrical current flows associated with the positive voltage pulses are essentially linear with regard to the increasingly larger positive voltage pulses; and
  detecting the electrical power load uses DC electrical power when the electrical current flows associated with the positive voltage pulses are essentially non-linear with regard to the increasingly larger positive voltage pulses; and
the control module to transmit a signal to the switch to configure the switch to receive electrical power from one of the AC electrical power source and the DC electrical power source and transmit the received electrical power to the electrical power load, responsive to the detection.

* * * * *